United States Patent
Yoshitake et al.

(10) Patent No.: US 9,234,080 B2
(45) Date of Patent: Jan. 12, 2016

(54) CONDUCTIVE RESIN COMPOSITION

(75) Inventors: Hideya Yoshitake, Tokyo (JP);
Masayuki Nishio, Ube (JP); Tsunao Matsuura, Ube (JP); Kenji Fukuda, Ube (JP); Ken Nakamura, Ube (JP); Keiichirou Koyashiki, Ube (JP); Masaki Yoshio, Saga (JP); Hirofumi Takemoto, Ube (JP)

(73) Assignee: Ube Industries, Ltd., Ube-shi, Yamaguchi (JP)

( * ) Notice: Subject to any disclaimer, the term of this patent is extended or adjusted under 35 U.S.C. 154(b) by 508 days.

(21) Appl. No.: 13/262,150

(22) PCT Filed: Apr. 1, 2010

(86) PCT No.: PCT/JP2010/056006

§ 371 (c)(1),
(2), (4) Date: Nov. 3, 2011

(87) PCT Pub. No.: WO2010/114089

PCT Pub. Date: Oct. 7, 2010

(65) Prior Publication Data

US 2012/0068125 A1    Mar. 22, 2012

(30) Foreign Application Priority Data

Apr. 2, 2009 (JP) ................................ 2009-090373
Sep. 4, 2009 (JP) ................................ 2009-204987

(51) Int. Cl.
*H01B 1/04* (2006.01)
*H01B 1/24* (2006.01)
(Continued)

(52) U.S. Cl.
CPC *C08J 3/215* (2013.01); *B01J 23/78* (2013.01); *B01J 35/002* (2013.01); *B01J 37/03* (2013.01);
(Continued)

(58) Field of Classification Search
CPC ............. H01B 1/04; H01B 1/24; B82Y 30/00
USPC ............... 252/500–519.1; 423/445 R–445 B; 977/753
See application file for complete search history.

(56) References Cited

U.S. PATENT DOCUMENTS 4,663,230 A    5/1987    Tennent
7,026,432 B2 *  4/2006    Charati et al. ................ 528/271
(Continued)

FOREIGN PATENT DOCUMENTS

EP    1 300 364 A2    4/2003
EP    1 637 563 A1    3/2006
(Continued)

OTHER PUBLICATIONS

J.P. Pinheiro, et al., Nanotubes and nanofilaments from carbon monoxide disproportionation over Co/MgO catalysts I. Growth versus catalyst state; Carbon 41 (2003), pp. 2949-2959.
(Continued)

*Primary Examiner* — Tri V Nguyen
(74) *Attorney, Agent, or Firm* — Nixon Peabody LLP; Jeffrey L. Costellia

(57) ABSTRACT

There is disclosed a conductive resin composition, comprising: (a) a resin component, and (b) a fine carbon fiber dispersed in the resin component, wherein a graphite-net plane consisting solely of carbon atoms forms a temple-bell-shaped structural unit comprising closed head-top part and body-part with open lower-end, 2 to 30 of the temple-bell-shaped structural units are stacked sharing a common central axis to form an aggregate, and the aggregates are connected in head-to-tail style with a distance to form the fiber. The resin composition has high conductivity while maintaining the original physical properties of the resin.

10 Claims, 7 Drawing Sheets

(a)

(b)

(51) Int. Cl.
| | |
|---|---|
| B82Y 30/00 | (2011.01) |
| C08J 3/215 | (2006.01) |
| B01J 23/78 | (2006.01) |
| B01J 35/00 | (2006.01) |
| B01J 37/03 | (2006.01) |
| C08J 5/04 | (2006.01) |
| D01F 9/127 | (2006.01) |
| H01M 4/58 | (2010.01) |
| H01M 4/62 | (2006.01) |
| H01M 10/052 | (2010.01) |

(52) U.S. Cl.
CPC .............. B82Y 30/00 (2013.01); C08J 5/042 (2013.01); D01F 9/127 (2013.01); H01M 4/5825 (2013.01); H01M 4/622 (2013.01); H01M 4/625 (2013.01); C08J 2327/18 (2013.01); H01M 10/052 (2013.01)

(56) References Cited

U.S. PATENT DOCUMENTS

| | | | |
|---|---|---|---|
| 2003/0044615 | A1 | 3/2003 | Yanagisawa et al. |
| 2003/0086859 | A1 | 5/2003 | Kawakami et al. |
| 2004/0005269 | A1 | 1/2004 | Huang et al. |
| 2004/0071990 | A1 | 4/2004 | Moriyama et al. |
| 2004/0181005 | A1 | 9/2004 | Warth et al. |
| 2004/0258606 | A1 | 12/2004 | Yamamoto et al. |
| 2006/0239897 | A1 | 10/2006 | Moy et al. |
| 2006/0281860 | A1 | 12/2006 | Higuchi et al. |
| 2009/0035569 | A1 | 2/2009 | Gonzalez Moral et al. |
| 2010/0113259 | A1 | 5/2010 | Ma et al. |
| 2010/0119949 | A1 | 5/2010 | Yano et al. |
| 2011/0003151 | A1 | 1/2011 | Nishio et al. |

FOREIGN PATENT DOCUMENTS

| | | | |
|---|---|---|---|
| EP | 2 131 422 | A1 | 12/2009 |
| EP | 2 251 465 | A1 | 11/2010 |
| JP | 01-131251 | | 5/1989 |
| JP | 02-235945 | | 9/1990 |
| JP | 03-074465 | | 3/1991 |
| JP | 2001-310994 | | 11/2001 |
| JP | 2003-206117 | | 7/2003 |
| JP | 2003-221217 | | 8/2003 |
| JP | 2003-227039 | | 8/2003 |
| JP | 2004-230926 | | 8/2004 |
| JP | 2004-231745 | | 8/2004 |
| JP | 2004-238791 | | 8/2004 |
| JP | 2004-299986 | | 10/2004 |
| JP | 2004-303613 | | 10/2004 |
| JP | 2004-323738 | | 11/2004 |
| JP | 2005-512925 | | 5/2005 |
| JP | 2006-103996 | | 4/2006 |
| JP | 2006-306960 | | 11/2006 |
| JP | 2007-169561 | | 7/2007 |
| JP | 2007-231219 | | 9/2007 |
| JP | 2008-230947 | | 10/2008 |
| JP | 2008-270204 | | 11/2008 |
| JP | 2008-277128 | | 11/2008 |
| JP | 2009-272041 | | 11/2009 |
| JP | 2010-031214 | | 2/2010 |
| WO | WO-90/10296 | | 9/1990 |
| WO | WO-91/03057 | A1 | 3/1991 |
| WO | WO 02/095097 | A1 | 11/2002 |
| WO | WO 03/050333 | A1 | 6/2003 |
| WO | WO-2009/110570 | A1 | 9/2009 |

OTHER PUBLICATIONS

N. Pierard. et al., "Production of short carbon nanotubes with open tips by ball milling"; Chemical Physics Letters, 335 (2001), pp. 1-8.

E. Flahaut, et al., "Gram-scale CCVD synthesis of double-walled carbon nanotubes"; ChemComm, 2003, pp. 1442-1443.
U.S. Office Action dated Dec. 7, 2012 issued in U.S. Appl. No. 12/920,769.
Supplementary European Search Report dated Jun. 7, 2012 issued in European Patent Application No. EP 10758860.0 by European Patent Office.
Third Party Observation, Application No. JP 2010-501963, Oct. 7, 2011.
Endo, "Basic of Carbon Nanotube and Frontier of Industrialization of Carbon Nanotube," Jan. 11, 2002, pp. 246-249.
Audier, "Morphology and Crystalline Order in Catalytic Carbons," Carbon, 1981, vol. 19, pp. 217-224.
Inagaki (editor), "Commentary on Carbon Family," Oct. 30, 2001, pp. 90-91.
Katayama, "Inorganic Material Science for Engineering," Apr. 10, 2006, p. 29.
Experimental Chemistry Course 28, "Chemistry of Nanotechnology," 5th edition, Chemical Society of Japan, Jul. 30, 2005, p. 34.
"Experimental Technology on Latest Carbon Materials (Book on Analysis)," Carbon Society of Japan, Nov. 30, 2001, p. 157.
Third Party Observation, Application No. EP 09716952.8, Jan. 17, 2012.
Third Party Observation, Application No. JP 2009-086198, Jun. 21, 2011.
Written Opinion, Application No. PCT/JP2010/056006, May 11, 2010.
Supplementary European Search Report dated Jul. 6, 2012 issued in European Patent Application No. 10758860.0 by European Patent Office.
Final Office Action dated Jun. 21, 2013 issued in a U.S. Appl. No. 12/920,769.
Extended European Search Report dated May 24, 2013 issued in an European Pat. App. No. 09 71 6952.8.
Y.A. Kim et al., "Effect of ball milling on morphology of cup-stacked carbon nanotubes"; Chemical Physics Letters, vol. 355, Apr. 2, 2002, pp. 279-284.
J.M. Feng et al., "Controlled growth of high quality bamboo carbon nanotube arrays by the double injection chemical vapor deposition process"; Materials Science & Engineering A, vol. 473, (2008), pp. 238-243.
L.Y. Heng et al., "Demonstration of the advantages of using bamboo-like nanotubes for electrochemical biosensor applications compared with single walled carbon nanotubes"; Electrochemistry Communications, vol. 7, (2005), pp. 1457-1462.
Y. Lu et al., "Formation of bamboo-shape carbon nanotubes by controlled rapid decomposition of picric acid"; Carbon, vol. 42, (2004), pp. 3199-3207.
E. Flahaut et al., "CCVD synthesis of carbon nanotubes from (Mg,Co, Mo)O catalysts: influence of the proportions of cobalt and molybdenum"; Journal of Materials Chemistry, vol. 14, (2004), pp. 646-653.
U.S. Appl. No. 13/381,118, Office Action mailed May 8, 2014.
Lin, et al., "Dynamical Observation of Bamboo-like Carbon Nanotube Growth," *Nano Letters* 7.8 (2007): 2234-2238.
Non-Final Office Action dated Aug. 27, 2014 issued in a U.S. Appl. No. 13/389,015.
Non-Final Office Action dated Aug. 27, 2014 issued in a U.S. Appl. No. 13/389,017.
H. Okuno et al., "Synthesis of carbon nanotubes and nano-necklaces by thermal plasma process", Carbon, Jul. 2, 2004, vol. 42, pp. 2543-2549.
Extended European Search Report issued Jan. 7, 2015 in an European Patent Application No. 10806535.0.
U.S. Office Action (U.S. Appl. No. 14/338,129) dated Jan. 16, 2015.
U.S. Office Action (U.S. Appl. No. 13/260,873) Dated Apr. 1, 2015.
U.S. Office Action (U.S. Appl. No. 13/389,015) Dated Apr. 23, 2015.
Wei C. et al., "Nanomechanics of Carbon Nanofibers: Structural and Elastic Properties", May 26, 2004, pp. 1-8, NASA Ames Research Center.

* cited by examiner (a)

(b)

(a)

(b)

CONDUCTIVE RESIN COMPOSITION

TECHNICAL FIELD

The present invention relates to a conductive resin composition with excellent molding processability, more specifically a resin composition containing ultrafine carbon fibers as a conductive material.

BACKGROUND ART

It is well known that a conductive resin is produced by kneading and dispersing a conductive filler in an electrically insulative resin for making the resin conductive for the purpose of prevention of static charge and the like. Examples of a material used as a conductive filler kneaded in a resin generally include ion-conductive organic surfactant, metal fiber and powder, conductive metal oxide powder, carbon black, carbon fiber and graphite powder. The material is melt-kneaded and dispersed in a resin to give a conductive resin composition, which is then molded to give a molded product with a volume resistance of $10^{-1}$ to $10^{12}$ $\Omega \cdot$cm.

If a flaky, whiskery or fibrous material with a large aspect ratio (length/outer diameter) is used as a conductive filler, even a relatively small amount thereof provides the conductivity to the resin. This is because a conductive filler with a larger aspect ratio forms inter-filler connection more effectively even if the same amount is used, resulting in imparting conductivity with a smaller amount.

A metal filler is, however, unsatisfactory in corrosion resistance and chemical resistance. Since an inorganic conductive filler is generally in a form of particle, it must be used in a large amount of more than 50% by weight to the total weight of a composition, which leads to the deterioration of physical properties of the resultant resin, and therefore, molding becomes more difficult. As carbon black, Ketjen Black (registered trademark, from Ketjen Black International Company) and acetylene black which form a conductive circuit having a chain structure can be utilized, so that it can impart high conductivity in an amount of 15% by weight or less. It is, however, difficult to control dispersion of these materials in a resin and special formulation and blending technique is required for achieving stable conductivity. Furthermore, even when adequate conductivity is achieved, not only the processability of the conductive resin composition is considerably deteriorated, but also physical properties such as tensile strength, bending strength and shock resistance are significantly deteriorated in comparison with original physical properties of the resin containing no conductive filler.

A conductive filler having a higher aspect ratio such as a flaky graphite powder and a whiskery carbon fiber must be also used in an amount of more than 15% by weight for imparting conductivity, which leads to deterioration in original properties of the resin, and thus, when a molding having a complex shape is to be formed, influence of non-uniformity and orientation of fibers becomes so significant that moldability and conductivity is deteriorated. Carbon particles or carbon fibers are easily detached from a molding surface (sloughing property), leading to problems such as environmental pollution and device damage in a semiconductor device process.

When carbon fibers are added in an equal weight, fibers having a smaller diameter are better in imparting conductivity because of easier formation of an inter-fiber conductive circuit network. Recently, hollow ultrafine carbon fibers having a smaller fiber diameter by two to three orders of magnitude than a conventional carbon fiber, so-called carbon nanotube, have been disclosed and it has been suggested to add it in a variety of resins and rubbers as a conductive filler (Patent Reference No. 1: Japanese Laid-Open publication No. H01-131251, Patent Reference No. 2: Japanese Laid-Open publication No. H03-74465, and Patent Reference No. 3: Japanese Laid-Open publication No. H02-235945), and it is believed to be an effective conductive filler eliminating the defects of the conventional conductive filler.

However, carbon nanotubes cannot be homogeneously dispersed in a resin and undispersed carbon nanotubes remain in the resin as an agglomerate, which causes unacceptable problems such as difficulty in spinning (yarn breakage), clogging of a filter in a discharge unit of a molding machine, deteriorated mechanical strength such as shock resistance of a molding and surface appearance. Therefore, special technique for composition formulation and blending and special surface modification treating are needed, including optimization of a resin molecular weight (Patent Reference No. 4: Japanese Laid-Open publication No. 2001-310994), addition of a modified resin, an elastomer and a compatibilizing agent (Patent Reference No. 5: Japanese Laid-Open publication No. 2007-231219, Patent Reference No. 6: Japanese Laid-Open publication No. 2004-230926, Patent Reference No. 7: Japanese Laid-Open publication No. 2007-169561, and Patent Reference No. 8: Japanese Laid-Open publication No. 2004-231745), and surface modification of a carbon nanotube (Patent Reference No. 9: Japanese Laid-Open publication No. 2004-323738), which limit the type of a resin and formulation, and the like.

PATENT REFERENCES

Patent Reference No. 1: Japanese Laid-Open publication No. H01-131251.
Patent Reference No. 2: Japanese Laid-Open publication No. H03-74465.
Patent Reference No. 3: Japanese Laid-Open publication No. H02-235945.
Patent Reference No. 4: Japanese Laid-Open publication No. 2001-310994.
Patent Reference No. 5: Japanese Laid-Open publication No. 2007-231219.
Patent Reference No. 6: Japanese Laid-Open publication No. 2004-230926.
Patent Reference No. 7: Japanese Laid-Open publication No. 2007-169561.
Patent Reference No. 8: Japanese Laid-Open publication No. 2004-231745.
Patent Reference No. 9: Japanese Laid-Open publication No. 2004-323738.

SUMMARY OF INVENTION

Problem to be Solved by the Invention

An objective of the present invention is to provide a resin composition having high conductivity while maintaining the original physical properties of the resin, in which ultrafine carbon fibers are blended and dispersed in a resin without using special kneading/blending method or formulation technique or additives such as a rubber component, a surfactant and a compatibilizing agent.

Means for Solving Problem

The present invention relates to the following items.
1. A conductive resin composition, comprising:
   (a) a resin component, and
   (b) a fine carbon fiber dispersed in the resin component, wherein a graphite-net plane consisting solely of carbon atoms forms a temple-bell-shaped structural unit comprising closed head-top part and body-part with open lower-end, 2 to 30 of the temple-bell-shaped structural units are stacked sharing a common central axis to form an aggregate, and the aggregates are connected in head-to-tail style with a distance to form the fiber.

2. The composition according to the above item 1, wherein an angle θ formed by a generatrix of the body-part and a fiber axis is less than 15°, 3. The composition according to the above item 1 or 2, wherein an end of the body-part of the aggregate has an outer diameter D of 5 to 40 nm and an inner diameter d of 3 to 30 nm, and an aspect ratio (L/D) of the aggregate is 2 to 150.

4. The composition according to any one of the above items 1 to 3, wherein the fine carbon fiber is produced by vapor phase growth using a catalyst containing an element selected from the group consisting of Fe, Co, Ni, Al, Mg and Si, and an ash content in the fine carbon fiber is 4% by weight or less 5. The composition according to any one of the above items 1 to 4, wherein the fine carbon fiber is a fine short carbon fiber in which 100 or less of the aggregates are connected.

6. The composition according to the above item 5, wherein the fine short carbon fibers are produced by fiber shortening by applying shear stress.

7. The composition according to any one of the above items 1 to 6, comprising the fine carbon fibers in an amount of 0.1% by weight or more and less than 40% by weight, based on the total weight of the composition.

8. The composition according to any one of the above items 1 to 7, wherein the resin component is selected from thermoplastic resins.

9. The composition according to the above item 8, wherein the resin component is a polyamide.

10. A conductive binder comprising the composition according to any one of the above items 1 to 7 and a carbon material having a structure configuration, whereby forming a composite material.

11. A process for manufacturing the conductive binder according to the above item 10, comprising (a) dispersing fine carbon fibers (including fine short carbon fibers) and a carbon material having a structure configuration in an aqueous dispersion and/or solution of a resin component using a stirrer generating shear force;

(b) adding an alcohol or an aqueous solution of a metal salt to the dispersion prepared in step (a) to allow a composite material to be precipitated; and (c) filtering, washing and drying the composite material.

12. An electrode for an electrical charge storage device comprising the conductive binder according to the above item 10.

13. An electrical charge storage device comprising the electrode for an electrical charge storage device according to the above item 12.

Effect Of The Invention

The present invention provides a resin composition having high moldability and conductivity while maintaining the original physical properties of the resin. In the conductive resin composition of the present invention, high conductivity is achieved by the addition of a small amount of fine carbon fibers. Thus, a conductive resin composition can be provided without significant deterioration in the original properties of a resin such as moldability. It is believed that a conductive resin composition of the present invention has high conductivity by the following reasons.

First, conventional ultrafine carbon fibers collectively called as carbon nanofiber or carbon nanotube can be generally categorized into the following three nanostructured carbon materials based on their shapes, configurations and structures:

(1) Multilayer carbon nanotube (multilayer concentric cylindrical graphite layer)(non-fishbone type);
Japanese publication of examined application Nos. H03-64606 and H03-77288
Japanese Laid-Open publication No. 2004-299986

(2) Cup stack type carbon nanotube (fishbone type);
U.S. Pat. No. 4,855,091
M. Endo, Y A. Kim etc.: Appl. Phys. Lett., vol 80 (2002) 1267 et seq.
Japanese Laid-Open publication No. 2003-073928
Japanese Laid-Open publication No. 2004-360099

(3) Platelet type carbon nanofiber (card type)
H. Murayama, T. maeda,: Nature, vol 345 [No. 28] (1990) 791 to 793
Japanese Laid-Open publication No. 2004-300631.

In a (1) multilayer carbon nanotube, conductivity in a longitudinal direction of the carbon nanotube is high because electron flow in a graphite network plane (C-axis) direction contributes to conductivity in a longitudinal direction. On the other hand, for inter-carbon-nanotube conductivity, electron flow is perpendicular to a graphite network plane (C-axis) direction and is generated by direct contact between fibers, but it is believed that within a resin, since inter-fiber contact is not so contributive, electron flow by electrons emitted from the surface layer of a conductive filler plays more important role than electron flow in fibers. Ease of electron emission involves conductivity performance of a filler. It is supposed that in a carbon nanotube, a graphite network plane is cylindrically closed and jumping effect (tunnel effect hypothesis) by n-electron emission little occurs.

In an ultrafine carbon fiber having a (2) fishbone or (3) card type structure, an open end of a graphite network plane is exposed in a side peripheral surface, so that conductivity between adjacent fibers is improved in comparison with a carbon nanotube. However, since the fiber has a piling structure in which C-axis of a graphite network plane is inclined or orthogonal to a fiber axis, conductivity in a longitudinal fiber-axis direction in a single fiber is reduced, resulting in reduced conductivity as the whole composition.

In contrast, fine carbon fibers contained in a composition of the present invention are conductive carbon fibers which do not belong to any of three categories (1) to (3). As described later, it is possible that a temple-bell-shaped body slightly inclined outward is responsible for electron flow in a longitudinal direction of the fiber itself while electron emission from the open end of the temple-bell-shaped body is responsible for inter-fiber electron flow, and this probably contributes to improvement in conductivity performance in the resin.

It is also supposed that the presence of the open end which is an active site leads to high affinity for a resin and improved dispersibility in kneading and at the same time contributes to maintenance and improvement of the physical properties of the resin.

Since a bonding-part of aggregates of temple-bell-shaped structural units (described later) are connected via a weak van der Waals' force, the aggregates are separated off at the bonding site by shear force during kneading. In general, in catalytic vapor phase growth which is believed at present to be the most promising approach for large-scale production, agglomerates in which long filamentous fibers having a length of 1 μm or more are intricately-entangled (several μm to 1 mm fuzzballs) are formed. However, fine carbon fibers used in the present invention are cut in a proper length by adjusting shear force, promoting shortening and opening of fiber assemblies, so that a conductive resin composition can be provided without using special dispersing technique or device.

Furthermore, fine short carbon fibers are formed by cutting fibers in bonding sites, resulting in further improvement in dispersibility.

MODE FOR CARRYING OUT THE INVENTION

Figure 1:
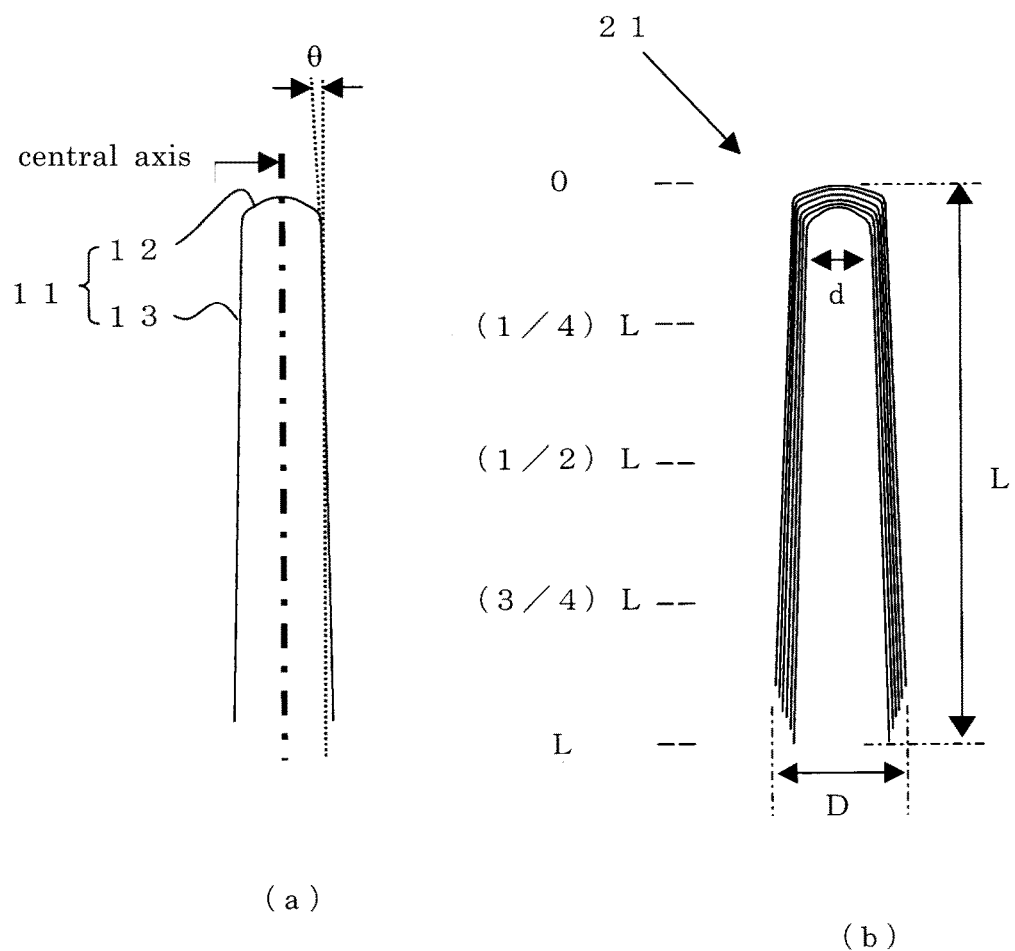
FIG. 1(a) is a drawing schematically showing a minimal structural unit (temple-bell-shaped structural unit) constituting a fine carbon fiber.
FIG. 1(b) is a drawing schematically showing an aggregate consisting of 2 to 30 stacked temple-bell-shaped structural units.
Figure 2:
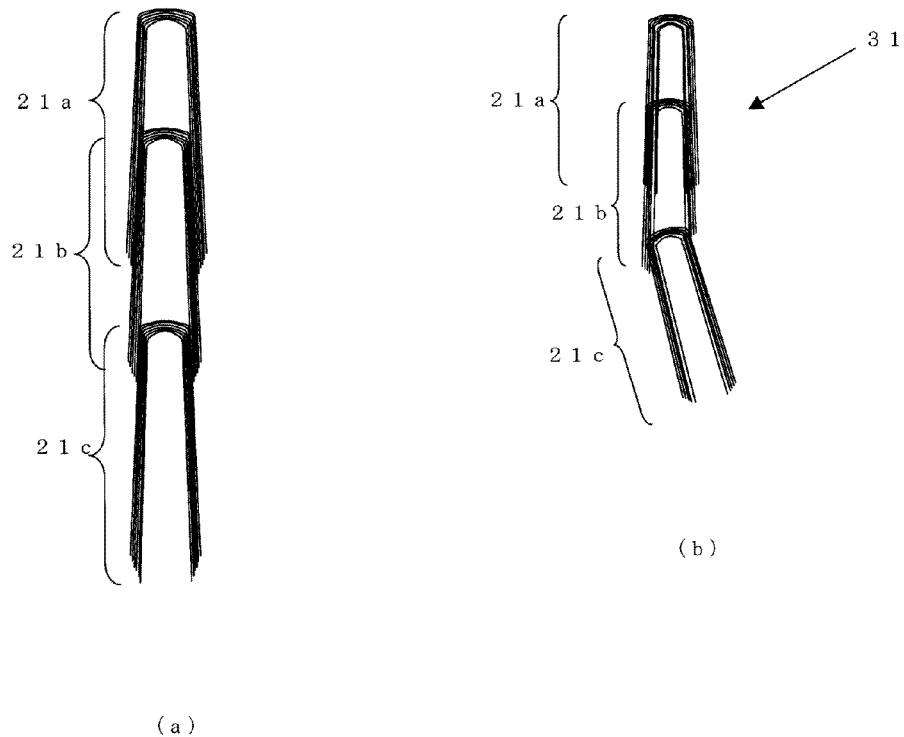
FIG. 2(a) is a drawing schematically showing connecting aggregates with a certain distance to form a fiber.
FIG. 2(b) is a drawing schematically showing curved connection when aggregates are connected with a certain distance.

There will be detailed the present invention. Herein, "fine short carbon fiber" is a concept embraced by "fine carbon fiber", and refers to a short-fiber having a shorter fiber length among "fine carbon fibers" as described later. In the following description, "fine carbon fiber" generally means "fine carbon fiber which is not shortened". Unless otherwise indicated, "fine carbon fiber" and "fine short carbon fiber" denote a carbon fiber having a particular structure described below, and does not mean a carbon fiber having a known structure.

Fine Carbon Fiber and Fine Short Carbon Fiber

The following description summarizes typical features and typical production processes for a fine carbon fiber or fine short carbon fiber contained in a composition of the present invention.

1. A fine carbon fiber preferably produced by vapor growth, wherein
a graphite-net plane consisting solely of carbon atoms forms a temple-bell-shaped structural unit comprising closed head-top part and body-part with open lower-end, where an angle θ formed by a generatrix of the body-part and a fiber axis is less than 15°,
2 to 30 of the temple-bell-shaped structural units are stacked sharing a common central axis to form an aggregate, and
the aggregates are connected in head-to-tail style with a distance to form the fiber.

2. The fine carbon fiber according to the above item 1, wherein an end of the body-part of the aggregate has an outer diameter D of 5 to 40 nm and an inner diameter d of 3 to 30 nm, and an aspect ratio (L/D) of the aggregate is 2 to 30.

3. The fine carbon fiber according to the above item 1 or 2, wherein an ash content is 4% by weight or less.

4. The fine carbon fiber according to any one of the above items 1 to 3, wherein a peak half width W (unit: degree) of 002 plane in the fine carbon fiber is 2 to 4 as determined by X-ray diffractometry.

5. The fine carbon fiber according to any one of the above items 1 to 4, wherein a graphite plane gap (d002) of the fine carbon fiber is 0.341 to 0.345 nm as determined by X-ray diffractometry.

6. A process for manufacturing a fine carbon fiber comprising feeding a mixed gas containing CO and $H_2$ onto a catalyst containing an element selected from the group consisting of Fe, Co, Ni, Al, Mg and Si, to initiate a reaction and growing the fine carbon fiber; wherein the catalyst preferably comprises a spinel-type oxide of cobalt, in which magnesium is contained by substitution forming solid solution.

7. The process for manufacturing a fine carbon fiber according to the above item 6, wherein when the spinel-type oxide is represented by $Mg_xCo_{3-x}O_y$, "x" which is a solid solution range of magnesium is 0.5 to 1.5.

8. The process for manufacturing a fine carbon fiber according to the above item 6 or 7, wherein in the spinel-type oxide, a crystal lattice constant "a" (cubic system) is 0.811 to 0.818 nm as determined by X-ray diffraction measurement.

9. The process for manufacturing a fine carbon fiber according to any one of the above items 6 to 8, wherein a volume ratio of $CO/H_2$ in the mixed gas is within the range of 70/30 to 99.9/0.1 and a reaction temperature is within the range of 400 to 650° C.

10. A fine short carbon fiber prepared by shortening a fine carbon fiber preferably produced by vapor growth, wherein a graphite-net plane forms a temple-bell-shaped structural unit comprising closed head-top part and body-part with open lower-end, 2 to 30 of the temple-bell-shaped structural units are stacked sharing a central axis to form an aggregate, and one to several tens of the aggregates are connected in head-to-tail style.

11. The fine short carbon fiber according to the above item 10, wherein the generatrix of the body-part and the fiber axis form an angle θ of less than 15°.

12. The fine short carbon fiber according to the above item 10 or 11, wherein an end of the body-part of the aggregate has an outer diameter D of 5 to 40 nm and an inner diameter d of 3 to 30 nm, and an aspect ratio (L/D) of the aggregate is 2 to 30.

13. The fine short carbon fiber according to any one of the above items 10 to 12, wherein an ash content is 4% by weight or less.

14. The fine short carbon fiber according to any one of the above items 10 to 13, wherein a peak half width W (unit: degree) of 002 plane in the fine carbon fiber is 2 to 4 as determined by X-ray diffractometry.

15. The fine short carbon fiber according to any one of the above items 10 to 14, wherein a graphite plane gap (d002) of the fine carbon fiber is 0.341 to 0.345 nm as determined by X-ray diffractometry.

16. A fine short carbon fiber produced by shortening the carbon fiber according to any one of the above items 1 to 5 by applying shear stress.

17. A process for manufacturing a fine short carbon fiber, comprising preparing a fine carbon fiber by the manufacturing process according to any one of the above items 6 to 9 and then applying shear stress to the fiber for shortening.

There will be described the above items in details

Figure 3:
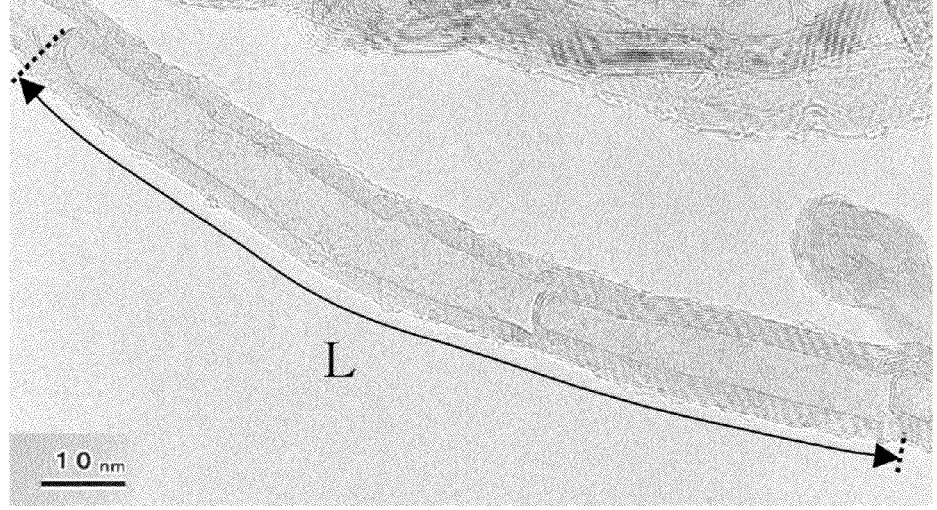
FIG. 3 is a TEM image of the fine carbon fiber produced in Reference Example A1.
Figure 7:
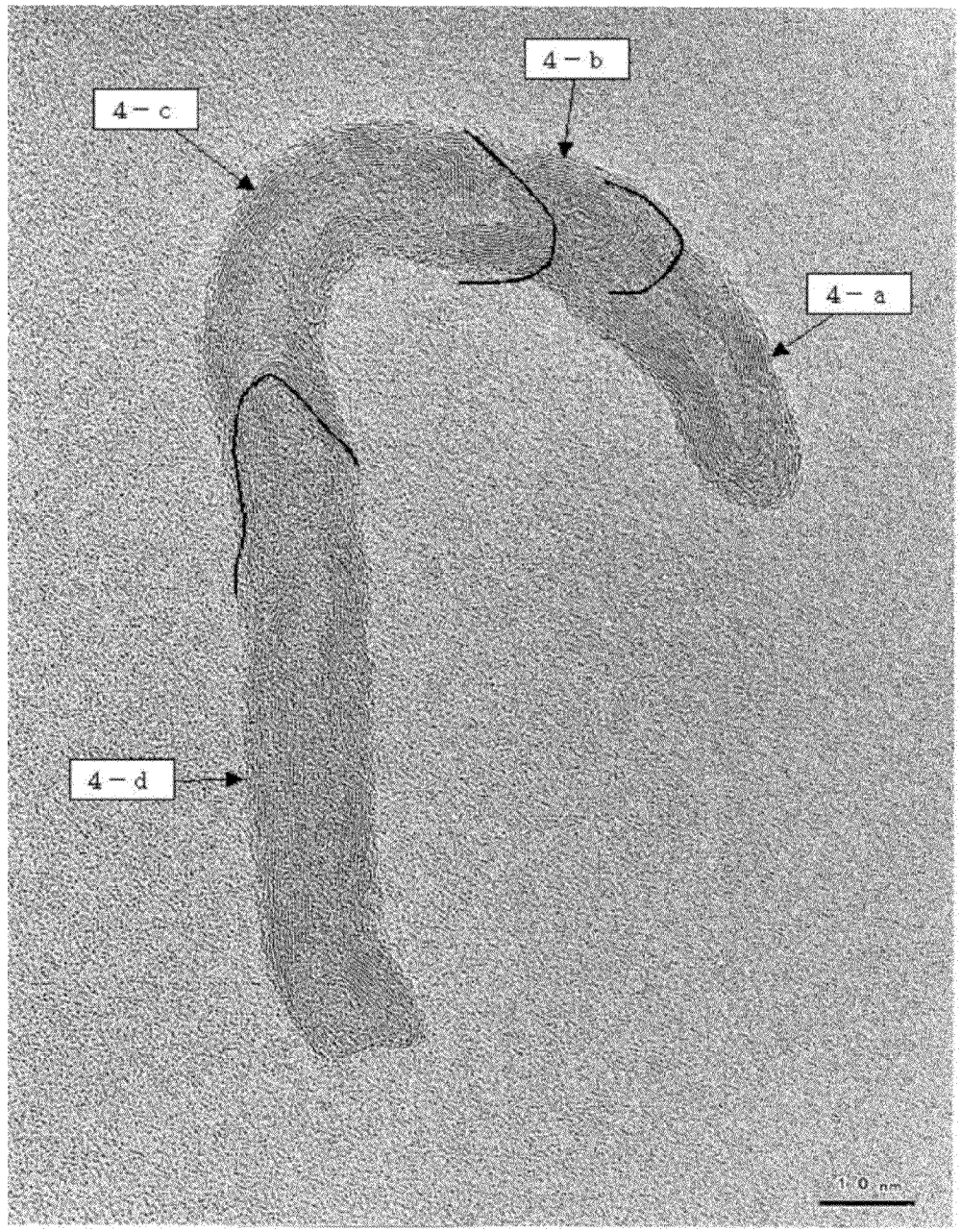
FIG. 7 is a TEM image of a fine carbon short fiber formed by shortening in Reference Example B1.
Figure 8:
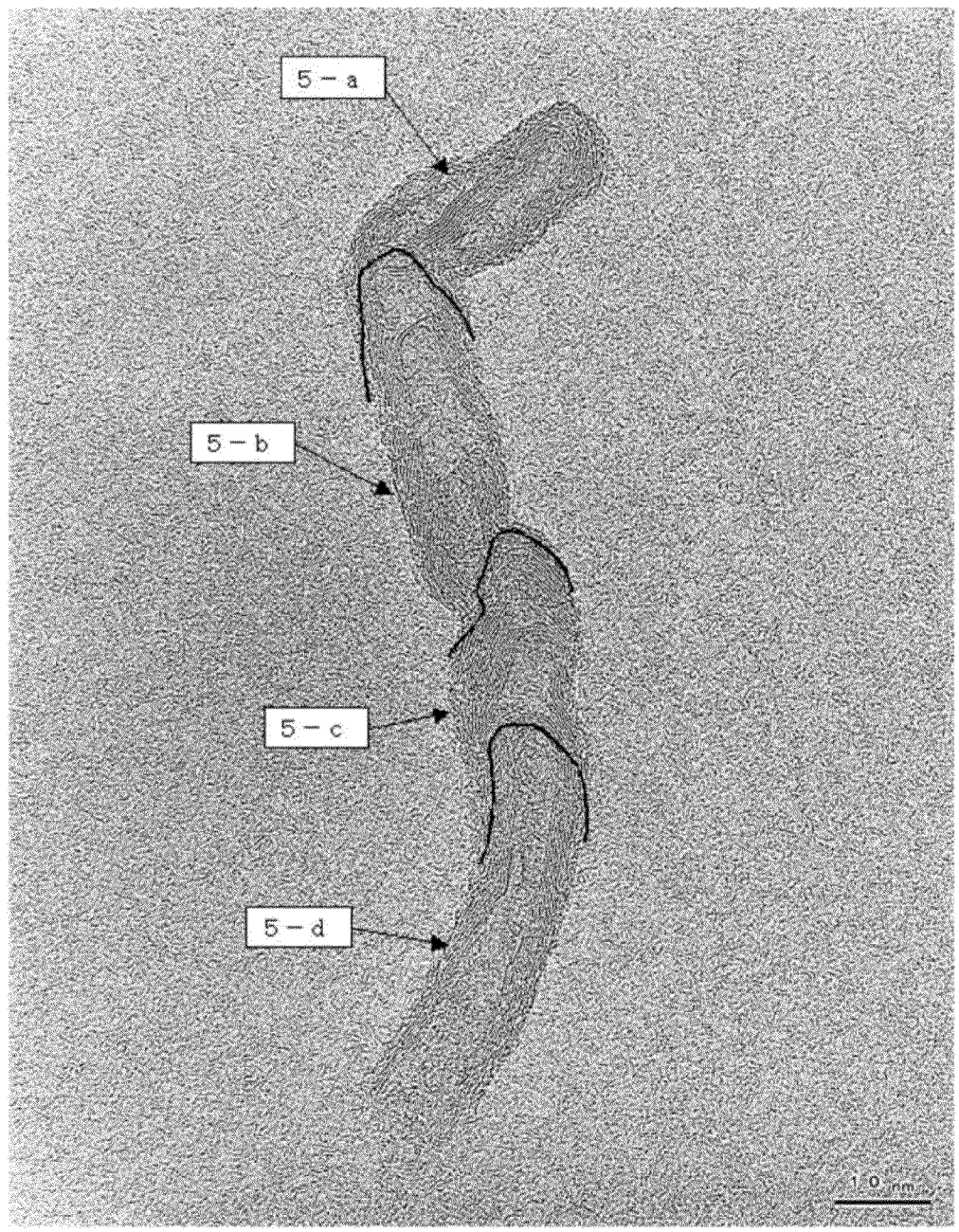
FIG. 8 is a TEM image of a fine carbon short fiber formed by shortening in Reference Example B1 as in FIG. 7.
Figure 9:
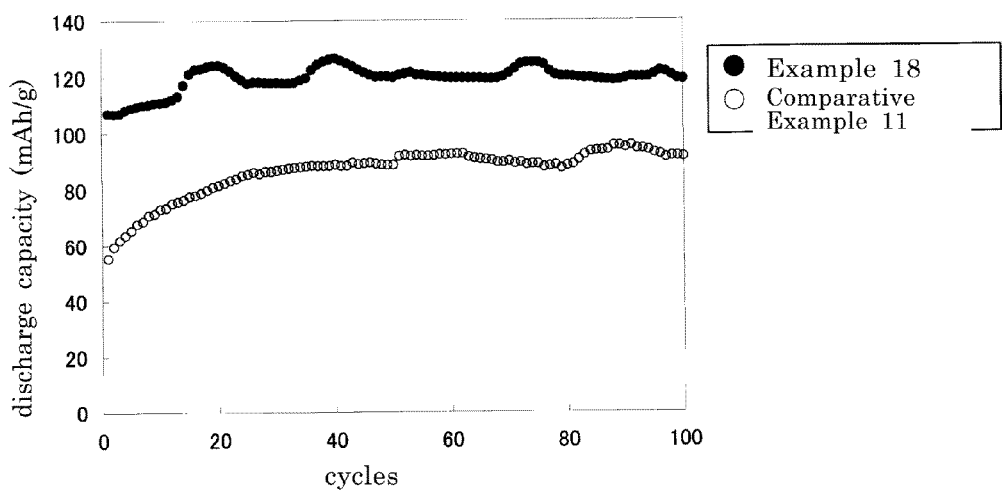
FIG. 9 is a graph showing discharge capacity of the coin batteries prepared in Example 18 and Comparative Example 11.

A fine carbon fiber and a fine short carbon fiber has a temple-bell-shaped structure as shown in FIG. 1(a) as a minimal structural unit. A temple bell is commonly found in Japanese temples, which has a relatively cylindrical-shaped body-part, which is different from a Christmas bell that is very close to cone-shape. As shown in FIG. 1(a), a structural unit 11 has a head-top part 12 and a body-part 13 having an open end like a temple bell and approximately has a shape as a body of rotation formed by rotation about a central axis. The structural unit 11 is constituted by a graphite-net plane consisting solely of carbon atoms, and the circumference of the open-end of the body-part is the open end of the graphite-net plane. Here, although the central axis and the body-part 13 are, for convenience, indicated by a straight line in FIG. 1(a), they are not necessarily straight, but may be curved as shown in FIGS. 3, 7 and 8 described later.

The body-part 13 is gradually enlarged toward the open-end side, and as a result, the generatrix of the body-part 13 is slightly oblique to the central axis of the temple-bell-shaped structural unit and an angle formed θ by these is less than 15°, more preferably 1°<θ<15°, further preferably 2°<θ<10°. With an excessively large θ, a fine fiber constituting from the structural units has a structure like a fish bone carbon fiber, leading to deterioration in conductivity in a fiber axis direction. On the other hand, with a smaller θ, it has a structure like a cylindrical tube and thus the open end of the graphite-net plane constituting the body-part in the structural unit are less exposed in the outer circumference surface of the fiber, leading to deterioration in conductivity between adjacent fibers.

The fine carbon fiber and the fine short carbon fiber have defects and irregular disturbances, but when their shape is observed as a whole neglecting such irregularity, it can be the that they have a temple-bell-shaped structure where the body-part 13 is gradually enlarged toward the open end side. In terms of a fine short carbon fiber and a fine carbon fiber of the present invention, the above description does not mean that θ is within the above range in all parts, but means that when the structural unit 11 is observed as a whole neglecting defects and irregular parts, θ generally is within the above range. Therefore, in determination of θ, it is preferable to eliminate an area near the head-top part 12 where a thickness of the body-part irregularly varies. More specifically, for example, when a length of a temple-bell-shaped structural unit aggregate 21 (see, the description below) is "L" as shown in FIG. 1(b), 8 may be measured at three points (¼)L, (½)L and (¾)L from the head-top part side and an average of the measured values is determined and the average may be regarded as θ for the whole structural unit 11. "L" is ideally measured in a straight line, but actually, the body-part 13 is often curved, and therefore, it can be measured along the curve in the body-part 13 to give a substantially more real value.

When produced as a fine carbon fiber (the same goes for a fine short carbon fiber), the head-top part has a shape which is smoothly connected to the body-part and convexly curved to the upper side (in the figure). A length of the head-top part is typically about "D" (see FIG. 1(b)) or less, sometimes about "d" (see FIG. 1(b)) or less, wherein "D" and "d" will be described for a temple-bell-shaped structural unit aggregate.

Furthermore, as described later, active nitrogen is not used as a starting material, so that other atoms such as nitrogen are not contained in the graphite-net plane of the temple-bell-shaped structural unit. Thus, the fiber exhibits excellent crystallinity.

In a fine carbon fiber and a fine short carbon fiber used in the present invention, as shown in FIG. 1(b), 2 to 30 of such temple-bell-shaped structural units are stacked sharing a central axis, to form a temple-bell-shaped structural unit aggregate 21 (hereinafter, sometimes simply referred to as an "aggregate"). The stack number is preferably 2 to 25, more preferably 2 to 15.

An outer diameter "D" of the body-part of the aggregate 21 is 5 to 40 nm, preferably 5 to 30 nm, further preferably 5 to 20 nm. A diameter of a fine fiber increases as "D" increases, so that in a composite with a polymer, a large amount needs to be added for giving particular functions such as conductivity. On the other hand, as "D" decreases, a diameter of a fine fiber decreases, so that fibers tend to more strongly agglomerate each other, leading to, for example, difficulty in dispersing them in preparation of a composite with a polymer. A body-part outer diameter "D" is determined preferably by measuring it at three points (¼)L, (½)L and (¾)L from the head-top part of the aggregate and calculating an average. Although FIG. 1(b) shows a body-part outer diameter "D" for convenience sake, an actual "D" is preferably an average of the measured values at the above three points.

An inner diameter "d" of the body-part of the aggregate is 3 to 30 nm, preferably 3 to 20 nm, further preferably 3 to 10 nm. Again, a body-part inner diameter "d" is determined preferably by measuring it at three points (¼)L, (½)L and (¾)L from the head-top part of the temple-bell-shaped structural unit aggregate and calculating an average. Although FIG. 1(b) shows a body-part inner diameter "d" for convenience sake, an actual "d" is preferably an average of the measured values at the above three points.

An aspect ratio (L/D) calculated from a length "L" of the aggregate 21 and a body-part outer diameter "D" is 2 to 150, preferably 2 to 30, more preferably 2 to 20, further preferably 2 to 10. With a larger aspect ratio, a fiber formed has a structure of a more cylindrical tube and conductivity in a fiber axis direction in a single fiber is improved, but the open ends of the graphite-net planes constituting the body-part of the structural units are less frequently exposed in the circumferential surface of the fiber, leading to deterioration in conductivity between adjacent fibers. On the other hand, with a smaller aspect ratio, the open ends of the graphite-net planes constituting the body-part of the structural units are more frequently exposed in the circumferential surface of the fiber, so that conductivity between adjacent fibers can be improved, but a fiber circumferential surface is constituted by a number of connected short graphite-net planes in a fiber axis direction, leading to deterioration in conductivity in a fiber axis direction in a single fiber.

The fine carbon fiber and the fine short carbon fiber share an essentially common configuration for a temple-bell-shaped structural unit and a temple-bell-shaped structural unit aggregate, but a fiber length is different as described below.

First, the fine carbon fiber is formed by connecting the aggregates in a head-to-tail style as shown in FIG. 2(a). A head-to-tail style means that in a configuration of the fine carbon fiber, a bonding site between adjacent aggregates is formed from a combination of the head-top part (head) of one aggregate and the lower end (tail) of the other aggregate. As a specific style of bonding the part, the head-top part of the outermost temple-bell-shaped structural unit in the second aggregate 21b is inserted into the inner part of the innermost temple-bell-shaped structural unit at a lower opening of a first aggregate 21a; and furthermore, the head-top part of a third aggregate 21c is inserted into the lower opening of a second aggregate 21b, and a number of such combinations are serially connected to form a fiber.

Each bonding part forming one fine fiber of the fine carbon fibers does not have structural regularity; for example, a length of a bonding part between a first aggregate and a second aggregate in a fiber axis direction is not necessarily equal to a length of a bonding part between the second aggregate and a third aggregate. Furthermore, as shown in FIG. 2(a), two aggregates bonded share a common central axis and may be connected in a straight line, but as in the temple-bell-shaped structural unit aggregates 21b and 21c shown in FIG. 2(b), they may be bonded without sharing a central axis, resulting in a curved structure in the bonding part. A length "L" of the temple-bell-shaped structural unit aggregate is approximately constant in each fiber. However, since in vapor phase growth, starting materials and byproduct gaseous components and a catalyst and a solid product component exist in mixture, a temperature distribution may occur in a reaction vessel; for example, a local site at a temporarily higher temperature generates depending on a flowing state of the above heterogeneous reaction mixture of a gas and a solid during an exothermic carbon precipitating reaction, possibly resulting in variation in a length "L" to some extent.

In the fine carbon fiber thus constituted, at least some of the open ends of the graphite-net planes in the lower end of the temple-bell-shaped structural units are exposed in the fiber circumferential surface, depending on a connection distance of the aggregates. Consequently, without conductivity in a fiber axis direction in a single fiber being deteriorated, conductivity between adjacent fibers can be improved due to jumping effect by π-electron emission (tunnel effect) as described above. Such a fine carbon fiber structure can be observed by a TEM image. Furthermore, it can be believed that the effects of a fine carbon fiber are little affected by curving of the aggregate itself or curving of the connection part of the aggregates. Therefore, parameters associated with a structure can be determined by observing an aggregate having a relatively straight part in a TEM image, as the structural parameters (θ, D, d, L) for the fiber.

Next, a fine short carbon fiber is prepared by further shortening the fine carbon fiber thus formed. Specifically, shear stress is applied to the fine carbon fiber, to cause sliding between graphite fundamental planes in the aggregate bonding part, so that the fine carbon fiber is shortened at some of the bonding parts of the aggregates to give a shorter fiber. The fine short carbon fiber formed by such fiber shortening is as short as a fiber length of 1 to about several ten aggregates (that is, 100 or less, up to about 80, preferably up to about 70), preferably one to 20 aggregates which are connected. An aspect ratio of the aggregates in this fine short carbon fiber is about 2 to 150. An aspect ratio of the aggregates in the fine short carbon fiber which is suitable for mixing is 2 to 50. Even when shear stress is applied, cleavage does not occur in a fiber straight body-part of the fiber consisting of carbon SP2 bonds in the aggregate, so that the fiber cannot be cut into a unit smaller than an aggregate.

Also in the fine short carbon fiber, since the end surface of the graphite net is exposed, conductivity between adjacent fibers is as high as a fine carbon fiber before fiber shortening due to jumping effect by π-electron emission (tunnel effect) as described above while conductivity in a fiber axis in a single fiber is not deteriorated. A structure of a fine short carbon fiber after fiber shortening as described above can be observed by a TEM image (see FIGS. 7 and 8). Furthermore, it can be believed that the effects of the fine short carbon fiber are little affected by curving of the aggregate itself or curving of the bonding part of the aggregates. In the fine short carbon fiber in FIG. 7, four temple-bell-shaped structural unit aggregates of 4-a to 4-d are connected as shown in the figure, and for each, θ and an aspect ratio (L/D) are 4-a: θ=4.8°, (L/D)=2.5; 4-b: θ=0.5°, (L/D)=2.0; 4-c: θ=4.5°, (L/D)=5.0; 4-d: θ=1.1°, (L/D)=5.5. In the fine short carbon fiber in FIG. 8, four temple-bell-shaped structural unit aggregates of 5-a to 5-d are connected as shown in the figure and for each, θ and an aspect ratio (L/D) are 5-a: θ=10°, (L/D)=4.3; 5-b: θ=7.1°, (L/D)=3.4; 5-c: θ=9.5°, (L/D)=2.6; 5-d: θ=7.1°, (L/D)=4.3.

In XRD by Gakushin-method of a fine carbon fiber and a short carbon fiber, a peak half width W (unit: degree) of 002 plane measured is within the range of 2 to 4. If W is more than 4, graphite exhibits poor crystallinity and poor conductivity. On the other hand, if W is less than 2, graphite exhibits good crystallinity, but at the same time, fiber diameter becomes large, so that a larger amount is required for giving functions such as conductivity to a polymer.

A graphite plane gap d002 as determined by XRD using Gakushin-method of a fine carbon fiber and a short carbon fiber is 0.350 nm or less, preferably 0.341 to 0.348 nm. If d002 is more than 0.350 nm, graphite crystallinity is deteriorated and conductivity is reduced. On the other hand, a fiber of 0.341 nm is produced in a low yield in the production.

The ash content contained in the fine carbon fiber and the short carbon fiber is 4% by weight or less, and therefore, purification is not necessary for a common application. Generally, it is 0.3% by weight or more and 4% by weight or less, more preferably 0.3% by weight or more and 3% by weight or less. The ash content is determined from a weight of an oxide as a residue after combustion of 0.1 g or more of a fiber.

A short carbon fiber has a fiber length of preferably 100 to 1000 nm, more preferably 100 to 300 nm. A fine short carbon fiber having such a length in which a peak half width W (unit: degree) of the above 002 plane is 2 to 4 and a graphite plane gap d002 is 0.350 nm or less, preferably 0.341 to 0.348 nm is a novel fiber which is not known in the prior art.

There will be described a process for manufacturing a fine carbon fiber and a short carbon fiber. A fine short carbon fiber is produced by shortening a fine carbon fiber.

Process For Manufacturing A Fine Carbon Fiber

First, a process for manufacturing a fine carbon fiber is as follows. The fine carbon fiber is produced by vapor phase growth using a catalyst. Preferred catalyst comprises an element selected from the group consisting of Fe, Co, Ni, Al, Mg and Si, and the preferred feed gas is a mixed gas containing CO and $H_2$. Most preferably, using a catalyst which is an oxide of cobalt having a spinel type crystal structure containing magnesium by substitution forming solid solution, vapor phase growth is conducted supplying a mixed gas containing CO and $H_2$ to the catalyst particles to produce a fine carbon fiber.

A spinel type crystal structure of cobalt where Mg is substituted forming solid solution is represented by $Mg_xCo_{3-x}O_y$. In this formula, x is a number indicating substitution of Co by Mg, and nominally, 0<x<3. Furthermore, y is a number selected such that electric charge of the whole formula becomes neutral, and is formally a number of 4 or less. That is, a spinel-type oxide of cobalt $Co_3O_4$ contains divalent and trivalent Co ions, and when divalent and trivalent cobalt ions are represented by $Co^{II}$ and $Co^{III}$, respectively, a cobalt oxide having a spinel type crystal structure is represented by $Co^{II}Co^{III}_2O_4$. Both sites of $Co^{II}$ and $Co^{III}$ are substituted by Mg to form a solid solution. After the solid solution formation by substitution with Mg for $Co^{III}$, electric charge is kept to be neutral and thus y is less than 4. However, both x and y have a value within a range that a spinel type crystal structure can be maintained.

For the use as a catalyst, a solid solution range of Mg represented by x is preferably 0.5 to 1.5, more preferably 0.7 to 1.5. A solid solution amount as x of less than 0.5 results in poor catalyst activity, leading to production of a fine carbon fiber in a lower yield. If x is more than 1.5, it is difficult to produce a spinel type crystal structure.

A spinel-type oxide crystal structure of the catalyst can be confirmed by XRD, and a crystal lattice constant "a" (cubic system) is within the range of 0.811 to 0.818 nm, more preferably 0.812 to 0.818 nm. If "a" is small, substitutional solid solution formation with Mg is inadequate and catalyst activity is low. The above spinel-type oxide crystal having a lattice constant larger than 0.818 nm is difficult to produce.

We suppose that such a catalyst is suitable because solid solution formation by substitution with magnesium in the spinel structure oxide of cobalt provides a crystal structure as if cobalt is dispersedly placed in magnesium matrix, so that under the reaction conditions, aggregation of cobalt is inhibited.

A particle size of the catalyst can be selected as appropriate and for example, is 0.1 to 100 μm, preferably 0.1 to 10 μm as a median diameter.

Catalyst particles are generally placed on an appropriate support such as a substrate or a catalyst bed by an appropriate application method such as spraying, for use. Spraying catalyst particles on a substrate or catalyst bed can be conducted by directly spraying the catalyst particles or spraying a suspension of the particles in a solvent such as ethanol and then drying it to spray a desired amount.

It is also preferable that catalyst particles are activated before being reacted with a source gas. Activation is generally conducted by heating under a gas atmosphere containing $H_2$ or CO. Such activation can be conducted by diluting the above gas with an inert gas such as He and $N_2$ as necessary. A temperature at which activation is conducted is preferably 400 to 600° C., more preferably 450 to 550° C.

There are no particular restrictions to a reactor for vapor phase growth, which can be conducted using a reactor such as a fixed-bed reactor and a fluidized-bed reactor.

A mixed gas containing CO and $H_2$ is used as a source gas to be a carbon source in vapor-phase growth.

An addition concentration of H2 gas $\{(H_2/(H_2+CO)\}$ is preferably 0.1 to 30 vol %, more preferably 2 to 20 vol %. When the addition concentration is too low, cylindrical graphite net planes form a carbon-nanotube-like structure parallel to a fiber axis. On the other hand, if it is more than 30 vol %, the angle of the temple-bell-shaped structure oblique to the fiber axis of a carbon side peripheral surface becomes larger and similar to a fish-bone shape, leading to lower conductivity in a fiber direction.

The source gas can contain an inert gas. Examples of such an inert gas include $CO_2$, $N_2$, He and Ar. The inert gas is preferably contained in such an amount that it does not significantly reduce a reaction rate; for example, 80 vol % or less, preferably 50 vol % or less. Furthermore, a synthetic gas containing $H_2$ and CO or a waste gas such as a steel converter exhaust gas can be, as necessary, used after appropriate treatment.

A reaction temperature for conducting vapor-phase growth is preferably 400 to 650° C., more preferably 500 to 600° C. If a reaction temperature is too low, a fiber does not grow. On the other hand, if a reaction temperature is too high, an yield is reduced. A reaction time is, but not limited to, for example, 2 hours or more and about 12 hours or less.

In terms of a reaction pressure, vapor-phase growth can be conducted at an ambient pressure from the viewpoint of convenience of a reactor or operation, but as long as carbon growth of Boudouard equilibrium proceeds, the reaction can be conducted under the pressurized or reduced-pressure condition.

It has been demonstrated that according to this manufacturing process for a fine carbon fiber, an yield of a fine carbon fiber per a unit weight of the catalyst is considerably higher than that in a conventional manufacturing process. An yield of a fine carbon fiber according to this manufacturing process for a fine carbon fiber is 40 folds or more, for example 40 to 200 folds per a unit weight of the catalyst. As a result, a fine carbon fiber containing reduced amount of impurities and ash content as described above can be produced.

Although a process of forming the bonding part unique to the fine carbon fiber prepared by this manufacturing process for a fine carbon fiber is not clearly understood, it is speculated that balance between exothermic Boudouard equilibrium and heat removal by source-gas flowing causes variation of a temperature near the fine cobalt particles formed from the catalyst, so that carbon growth intermittently proceeds, resulting in formation of the bonding part. In other words, it is speculated that four processes: [1] formation of a head-top part of a temple-bell-shaped structure, [2] growth of a body-part in the temple-bell-shaped structure, [3] pause of growth due to temperature increase caused by the processes [1] and [2], and [4] cooling by a flowing gas, are repeated on fine catalyst particles, to form the bonding part unique to a fine carbon fiber structure.

Manufacturing Process for a Fine Short Carbon Fiber

As described above, a fine carbon fiber can be produced. Next, a fine short carbon fiber can be produced by separating a fine carbon fiber to shorten it. Preferably, it is prepared by applying shear stress to the fine carbon fiber. Suitable examples of a specific fiber shortening method include those using a grinder, a tumbling ball mill, a centrifugal ball mill, a centrifugal planetary ball mill, a bead mill, a microbead mill, an attriter type high-speed ball mill, a rotating rod mill, a vibrating rod mill, a roll mill and a three-roll mill. The fiber shortening of the fine carbon fiber may be conducted in wet-process or dry-process. Wet fiber shortening may be conducted in the presence of either a resin or a resin and a filler. Since fine carbon fibers before fiber shortening aggregate like a fluff ball, the presence of a small medium capable of loosening such a ball can accelerate shredding and fiber shortening. Furthermore, coexistence of a fine filler allows for shortening of the fine carbon fiber and mixing and dispersing the filler can be conducted at the same time. An atmosphere in dry fiber shortening can be selected from an inert atmosphere or an oxidative atmosphere, depending on a purpose.

The reason why the fine carbon fiber can be easily shortened by applying shear stress is due to the structure of the fine carbon fiber. Specifically, it is because a fine carbon fiber is formed from temple-bell-shaped structural unit aggregates connected in a head-to-tail style with a distance. When shear stress is applied to the fiber, the fiber is pulled to the fiber axis direction indicated by an arrow in FIG. 6, and then sliding occurs between carbon fundamental planes constituting a bonding part (in FIG. 6, see region A: "two sticks" shape which is Japanese katakana "ha"), and one to several ten temple-bell-shaped structural unit aggregates are pulled off at the head-to-tail bonding parts, resulting in fiber shortening. That is, the head-to-tail bonding part is not formed by consecutive carbon double bonds in a fiber axis direction like a concentric fine carbon fiber, but formed by bonds mainly via van der Waals force with a lower bond energy. When crystallinity is compared between a fine carbon fiber and a fine short carbon fiber prepared by shortening the above fine carbon fiber on the basis of a carbon layer gap and a true specific gravity, difference is not observed in carbon crystallinity between these. However, in comparison with the fine carbon fiber, the fine short carbon fiber after fiber shortening has a larger surface area by about 2 to 5%. Increase of a surface area to this extent would be due to fiber shortening, indicating that shortening of a fine carbon fiber is caused by the pulling-off of the temple-bell-shaped structural unit aggregates simply from their bonding sites, while carbon crystallinity of the temple-bell-shaped structural unit aggregates in the fine carbon fiber is not deteriorated.

Resin Component

In the present invention, a variety of resins can be used as a resin component in which fine carbon fibers or fine short carbon fibers are dispersed.

Preferable resins are moldable polymer compounds generally having a molecular weight of 10,000 or more and can be any of thermoplastic resins, elastomers, thermosetting resins, photo- and electron-beam curable resins and reactive resins. Furthermore, the polymer compound may be an organic polymer having a carbon main chain or an inorganic polymer containing silicon, sulfur and/or phosphorous.

Examples of a suitable thermoplastic resin include polyolefin resins (polyethylene, polypropylene, ethylene-vinyl acetate copolymer resins, ethylene-vinyl copolymer resins, ethylene-ethyl acrylate copolymer resins, ionomers and so on), polyamide resins (aliphatic polyamides such as Nylon 6, Nylon 66, Nylon 12 and Nylon 11 and their copolymers and aromatic polyamides such as Nylon 66/6T, Nylon 6T/6I and Nylon MXD6 and their copolymers), polyvinyl resins (polyvinyl chloride, styrene, ABS resins and so on), polyester resins (polyethylene terephthalate, polybutyrene terephthalate, polyethylene naphtholate, polycarbonate, liquid-crystal polymers and so on), polyether resins (polyoxymethylene, polyphenylene ether, aromatic polysulfones, polyether ketones, polyphenylene sulfide, polyetherimides and so on), fluororesins (polytetrafluoroethylene, polyvinylidene fluoride and so on), and these resins may be used alone or as a mixture of two or more.

The resin component may be selected from thermoplastic elastomers (olefin-, styrene-, ester, amide-, urethane- and polybutadiene-based type, and other types), and biodegradable resins. Typical examples of a thermosetting resin include phenol, amino, unsaturated polyester, polyimide, polyurethane, epoxy and silicone resins.

As the resin component, may be are oligomers having a molecular weight of less than 10,000, low-molecular-weight compound greases and oils, with which a composition can be prepared without deterioration in functions of a fine carbon fiber.

Conductive Resin Composition

A conductive resin composition of the present invention contains fine carbon fibers (including fine short carbon fibers) and a resin component as described above, and owing to excellent dispersibility of the fine carbon fibers, a content of the fine carbon fibers can be varied in a wider range than a "conventional ultrafine carbon fibers". A content of the fine carbon fibers can be appropriately varied within a range where desired conductivity is achieved without deterioration in moldability and mechanical properties of a molding. The content is generally 0.1 to 40% by weight, more preferably 0.25 to 10% by weight, further preferably 0.5 to 8% by weight, based on the total amount of the composition.

A conductive resin composition of the present invention in which fine carbon fibers are mixed in a resin is advantageous in the following applications. In a molding application, processability is improved and deformation and shrinkage are reduced. In an electric or electronic application, charging is prevented, and conductivity and electromagnetic wave shield can be realized. In a reinforcement application, an elastic modulus, rigidity, tensile strength and shock resistance are improved. In a thermal application, low thermal expansion, thermal conductivity and heat resistance are improved. In an acoustic or vibration application, vibration damping and properties of a vibrator such as for a speaker are improved. In a tribological application, abrasion resistance, slidability and powder-fall preventing property are improved. In a flame resistance application, dripping preventing property is improved.

In a conductive resin composition of the present invention, additional components can be combined for more effectively achieving a desired function. Examples of such additives include various pigments and fillers.

Examples of a pigment include extender pigments (transparent white pigments such as barium sulfate, calcium carbonate, silica and aluminum oxide), black pigments (for example, carbon black and magnetite), white pigments (for example, titanium dioxide, zinc oxide, tin dioxide and zirconium oxide), and black and colored pigments (for example, cobalt blue and titan yellow).

Examples of a filler include conductive fillers {metal-based type such as silver, copper, nickel and stainless fibers; oxide-based type such as ZnO, ITO, ATO, nitrides, carbides and borides; carbon-based type such as acetylene black and Ketjen Black (registered trademark, from Ketjen Black International Company), and organic material-based type}, magnetic fillers (for example, ferrite, Sm/Co and Nd/Fe/B), piezoelectric fillers, thermally-conductive fillers (Ag, h-BN, AlN and $Al_2O_3$), reinforcing fillers (for example, glass fiber, carbon fiber, MOS, talc and mica), moldable fillers, impact-resistant fillers, abrasion-resistant fillers, heat-resistant fillers (for example, clay minerals, talc, calcium carbonate and sedimentary barium sulfate), flame-retardant fillers (for example, zinc borate, red phosphorus, ammonium phosphate and magnesium hydroxide), sound/vibration insulating filler (for example, iron powder, barium sulfate, mica and ferrite), solid lubricant fillers (for example, graphite, molybdenum disulfide, fluororesin powder and talc), heat-ray radiating fillers (for example, hydrotalcite, aluminum oxide, charcoal and magnesium oxide).

The filler can have a shape such as particulate, spherical (for processability and fracture toughness), flat (flake)(for rigidity, damping, surface lubricity), needle (for mechanical and thermal reinforcement, conduction efficiency and damping), which can be selected depending on an application. These additional components can be appropriately added depending on the purpose of the application of a conductive resin composition. Typically, an additional component is added in a range of 2% by weight to 40% by weight, based on the total weight of the conductive resin composition.

A conductive resin composition of the present invention is prepared by blending (a) a resin component, (b) fine carbon fibers and an optional additional component by a known blending method. In particular, fine carbon fibers (including fine short carbon fibers) exhibits excellent dispersibility and thus, the composition can be prepared by a known kneading method using a known kneader.

For example, after fine carbon fibers and, if necessary additional components are added to a resin, they are dispersed in the melted or softened resin using, for example, a roll mill, melt blender (Banbury mixer, Brabender, ko-kneader), uniaxial kneader or biaxial kneader, to prepare the composition. The fine carbon fibers and the additional components can be supplied in one portion or portionwise.

One application of a conductive resin of the present invention is a conductive binder used in an electrical charge storage device using a nonaqueous solvent such as a battery, a capacitor and an electrochemical capacitor. A conductive binder is characterized that fine carbon fibers (including fine short carbon fibers), a carbon material having a structure configuration and a resin component are combined as composite. A structure configuration refers to a configuration where a number of spherical carbon particles are botryoidally linked or branched. Examples of a carbon material having a structure configuration include Ketjen Black (registered trademark, from Ketjen Black International Company), acetylene black, SUPER P (registered trademarks, from TIMCAL Graphite & Carbon Inc.), and SUPER 5, KS-4 and KS-6(these three are tradenames, from TIMCAL Graphite & Carbon Inc.), which are generally used as a conductive material, and among others, those having a surface area of 20 to 300 m$^2$/g are preferable.

When the composition is used as a conductive binder, the resin component is selected from resins conventionally used as binders for electrodes. Examples include fluoropolymers such as polytetrafluoroethylene (PTFE); olefin polymers such as polyethylene, polypropylene and ethylene-propylene polymers; vinyl polymers such as methyl acrylate polymers; diene polymers such as styrene-butadiene polymers and styrene-butadiene-isoprene polymers; celluloses such as carboxymethylcellulose and their ammonium salts and alkali metal salts; polycarboxylic acids such as modified poly (meth)acrylic acid and their alkali metal salts; and hydroxy-containing polymers such as polyvinyl alcohols, copolymers of (meth)acrylic acid with vinyl alcohol and copolymers of an acid with an alcohol. The conductive binder is preferably contained in such an amount that a weight ratio of the whole conductive materials (fine carbon fibers+a carbon material having a structure configuration) to the resin component is in the range of 0.5:1 to 4:1. In the case of conductive binder, the content of the fine carbon fibers can exceed the above-mentioned range, based on the total weight of the composition; for example, it can be, for example, up to about 70% by weight, preferably 40 to 70% by weight.

By producing an electrode using this conductive binder, electrode active materials are bound to each other without deterioration in conductivity, so that discharge properties or charge/discharge properties as an electrical charge storage device are not deteriorated. The increase of an output density is also realized.

A conductive binder is preferably prepared by the following steps (a) to (c);

(a) dispersing fine carbon fibers (including fine short carbon fibers) and a carbon material having a structure configuration in an aqueous dispersion and/or solution of a resin component using a stirrer generating shear force;

(b) adding an alcohol or an aqueous solution of a metal salt to the dispersion prepared in step (a) to allow a composite material to be precipitated; and (c) filtering, washing and drying the composite material.

When fine carbon fibers (including fine short carbon fibers) are added, they are preferably added as an aqueous solution prepared by dispersing the fibers using a dispersing agent such as a surfactant rather than as a solid. Depending on the type of a dispersing agent, it is preferable that the solution is basified with aqueous ammonia before step (b), and then a composite material is precipitated.

A concentration of the resin component in step (a) can be appropriately selected and a weight ratio of the resin component to the fine carbon fibers (including fine short carbon fibers) and the carbon material can be adjusted depending on an application.

The solvent added in step (b) is preferably an alcohol in the light of preventing contamination by a metal salt impurity. Such an alcohol is preferably a low-boiling alcohol allowing the resin component to be dried at a temperature of its melting point or lower and more preferably selected from methanol, ethanol and isopropanol.

There are no particular restrictions to a molding/forming method of a conductive resin composition of the present invention or the shape of a formed product. A molding/forming method can be selected from a variety of methods including melt spinning, extrusion molding, blow molding, injection molding, coating and press molding, which can be appropriately selected depending on the shape of products and compositions. Examples of the shape of products include film, sheet, filament, bar, tube, belt and three-dimensional product. A conductive molded product obtained from the composition of the present invention is useful as an electromagnetic-wave shielding member, an antistatic component, a member for electrostatic coating and an electrode in various electrical charge storage devices in the electric/electronic field and the automotive field, and further in applications such as a tray, a packing material, a building material for a clean room, a dust-free garment used in a manufacturing or transporting process of a semiconductor device, and a conductive member for an electronic device (for example, a belt, a sheath, a roll, a connector, a gear and a tube).

The method of coating the electrode in the electrical charge storage device is, but not limited to, that using an aqueous dispersion. When coating is conducted using an aqueous dispersion, if the conductive binder of the present invention is dispersed in an aqueous solution of a polymer of a cellulose derivative or an aqueous solution containing a cellulose derivative and an additional water-soluble polymer, it prevents the electrode active material from gelating and therefore the use of the aqueous dispersion is allowed. The cellulose derivative is preferably a salt of carboxymethylcellulose (CMC) and the additional water-soluble polymer is preferably an acidic polymer such as polyaniline-sulfonic acid.

EXAMPLES

There will be described Examples together with Comparative Examples.

Reference Examples A1 to A3

Synthesis of Fine Carbon Fibers

Reference Examples A1

In 500 mL of ion-exchanged water were dissolved 115 g of cobalt nitrate [Co(NO$_3$)$_2$.6H$_2$O: molecular weight 291.03] (0.40 mol) and 102 g of magnesium nitrate [Mg(NO$_3$)$_2$.6H$_2$O: molecular weight 256.41] (0.40 mol), to prepare raw-material solution (1). Furthermore, 220 g of powdery ammonium bicarbonate [(NH$_4$)HCO$_3$: molecular weight 79.06] (2.78 mol) was dissolved in 1100 mL of ion-exchanged water, to prepare raw-material solution (2). Next, raw-material solutions (1) and (2) were mixed at a reaction temperature of 40° C., after which the mixture was stirred for 4 hours. The precipitate formed was filtered, washed and then dried.

The product was calcined and pulverized with a mortar to provide 43 g of a catalyst. A crystal lattice constant "a" (cubic system) of the spinel structure in this catalyst was 0.8162 nm, and a metallic element ratio in the spinel structure of the substitutional solid solution was Mg:Co=1.4:1.6.

A quartz reaction tube (inner diameter: 75 mmcp, height: 650 mm) was perpendicularly fixed and in its center was placed a support of silica wool on which was then dispersed 0.9 g of the catalyst. Under He atmosphere, the tube was heated to a furnace temperature of 550° C., and then a mixed gas consisting of CO and $H_2$ (volume ratio: $CO/H_2=95.1/4.9$) as a source gas was fed from the bottom of the reaction tube at a flow rate of 1.28 L/min for 7 hours, to synthesize a fine carbon fiber.

An yield was 53.1 g, and an ash content was determined as 1.5% by weight. A peak half width "W" (degree) observed in XRD analysis of the product was 3.156 and d002 was 0.3437 nm. Furthermore, from a TEM image, parameters related to the dimensions of temple-bell-shaped structural units constituting the fine carbon fiber obtained and the aggregate of these were D=12 nm, d=7 nm, L=114 nm, L/D=9.5, θ=0 to 7° (average: about 3°). A stack number of the temple-bell-shaped structural units constituting the aggregate was 4 to 5. Here, D, d and θ were determined for three points (¼)L, (½)L and (¾)L from the head-top of the aggregate.

FIG. 3 shows a TEM image of the fine carbon fiber prepared in Reference Example A1.

Reference Example A2

In 900 mL of ion-exchanged water was dissolved 123 g of cobalt nitrate [$Co(NO_3)_2 \cdot 6H_2O$: molecular weight 291.03] (0.42 mol) and then was added 17 g of magnesium oxide [MgO: molecular weight 40.30] (0.42 mol), and the mixture was mixed to prepare raw-material slurry (1). Furthermore, 123 g of powdery ammonium bicarbonate [$(NH_4)HCO_3$: molecular weight 79.06] (1.56 mol) was dissolved in 800 mL of ion-exchanged water, to prepare raw-material solution (2). Next, raw-material slurry (1) and raw-material solution (2) were mixed at room temperature, after which the mixture was stirred for 2 hours. The precipitate formed was filtered, washed and then dried. The product was calcined and pulverized with a mortar to provide 48 g of a catalyst. A crystal lattice constant "a" (cubic system) of a spinel structure in this catalyst was 0.8150 nm, and a metallic element ratio in the spinel structure of the substitutional solid solution was Mg:Co=1.2:1.8.

A quartz reaction tube (inner diameter: 75 maw, height: 650 mm) was perpendicularly fixed and in its center was placed a support of silica wool on which was then dispersed 0.3 g of the catalyst. Under He atmosphere, the tube was heated to a furnace temperature of 500° C., and then from the bottom of the reaction tube, $H_2$ was fed at a flow rate of 0.60 L/min for 1 hour to activate the catalyst. Then, under He atmosphere, the tube was heated to a furnace temperature of 575° C. and then a mixed gas consisting of CO and $H_2$ (volume ratio: $CO/H_2=92.8/7.2$) as a source gas was fed at a flow rate of 0.78 L/min for 7 hours, to synthesize a fine carbon fiber.

An yield was 30.8 g and an ash content was 0.6% by weight. A peak half width "W" (degree) observed in XRD analysis of the product was 3.141 and d002 was 0.3433 nm. Furthermore, from a TEM image, parameters related to the dimensions of temple-bell-shaped structural units constituting the fine carbon fiber obtained and the aggregate of these were D=10 nm, d=5 nm, L=24 nm, L/D=2.4, θ=1 to 14° (average: about 6)°. A stack number of the temple-bell-shaped structural units constituting the aggregate was 4 to 5. Here, D, d and θ were determined for three points (¼)L, (½)L and (¾)L from the head-top of the aggregate.

Figure 4:
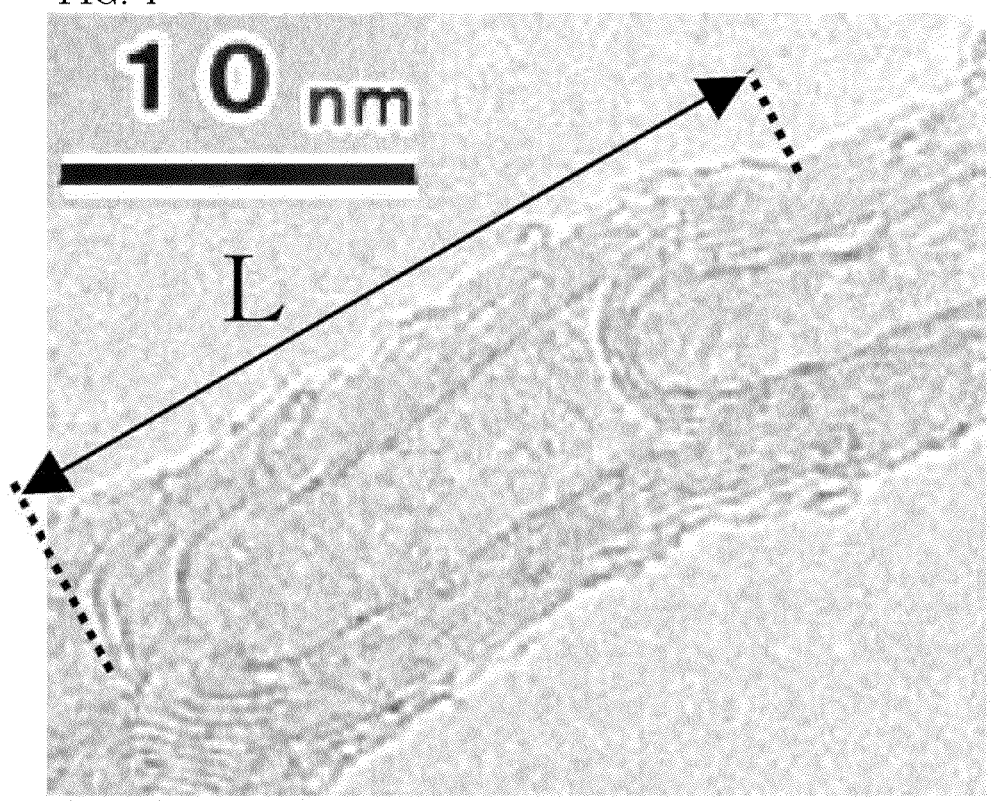
FIG. 4 is a TEM image of the fine carbon fiber produced in Reference Example A2.

FIG. 4 shows a TEM image of the fine carbon fiber prepared in Reference Example A2.

Reference Example A3

A catalyst was prepared as described in Reference Example A1, using 86 g of magnesium acetate [Mg$(OCOCH_3)_2 \cdot 4H_2O$: molecular weight 214.45] (0.40 mol) in place of magnesium nitrate. A crystal lattice constant "a" (cubic system) of a spinel structure in the catalyst thus prepared was 0.8137 nm, and a metallic element ratio in the spinel structure of the substitutional solid solution was Mg:Co=0.8:2.2.

A quartz reaction tube (inner diameter: 75 mmϕ, height: 650 mm) was perpendicularly fixed and in its center was placed a support of silica wool on which was then dispersed 0.6 g of the catalyst. Under He atmosphere, the tube was heated to a furnace temperature of 500° C., and then from the bottom of the reaction tube, $H_2$ was fed at a flow rate of 0.60 L/min for 1 hour to activate the catalyst. Then, under He atmosphere, the tube was heated to a furnace temperature of 590° C. and then a mixed gas consisting of CO and $H_2$ (volume ratio: $CO/H_2=84.8/15.2$) as a source gas was fed at a flow rate of 0.78 L/min for 6 hours, to synthesize a fine carbon fiber.

An yield was 28.2 g and an ash was 2.3% by weight. A peak half width "W" (degree) observed in XRD analysis of the product was 2.781 and d002 was 0.3425 nm. Furthermore, from a TEM image, parameters related to the dimensions of temple-bell-shaped structural units constituting the fine carbon fiber obtained and the aggregate of these were D=12 nm, d=5 nm, L=44 nm, L/D=3.7, θ=0 to 3° (average: about 2°). A stack number of the temple-bell-shaped structural units constituting the aggregate was 13. Here, D, d and θ were determined for three points (¼)L, (½)L and (¾)L from the head-top of the aggregate.

Figure 5:
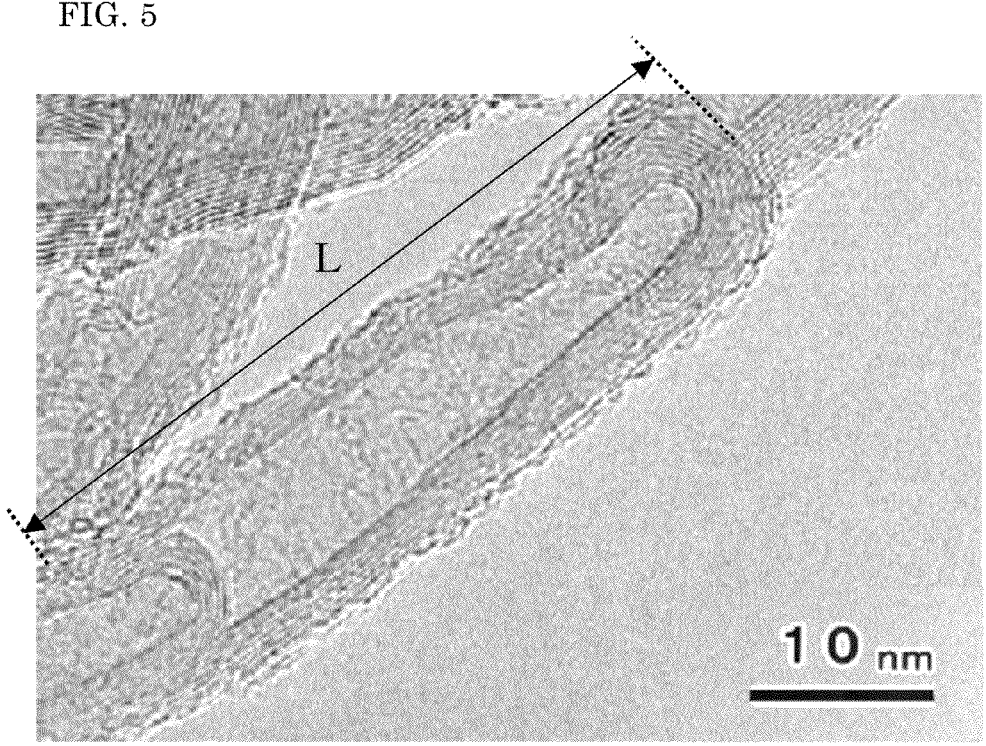
FIG. 5 is a TEM image of the fine carbon fiber produced in Reference Example A3.
Figure 6:
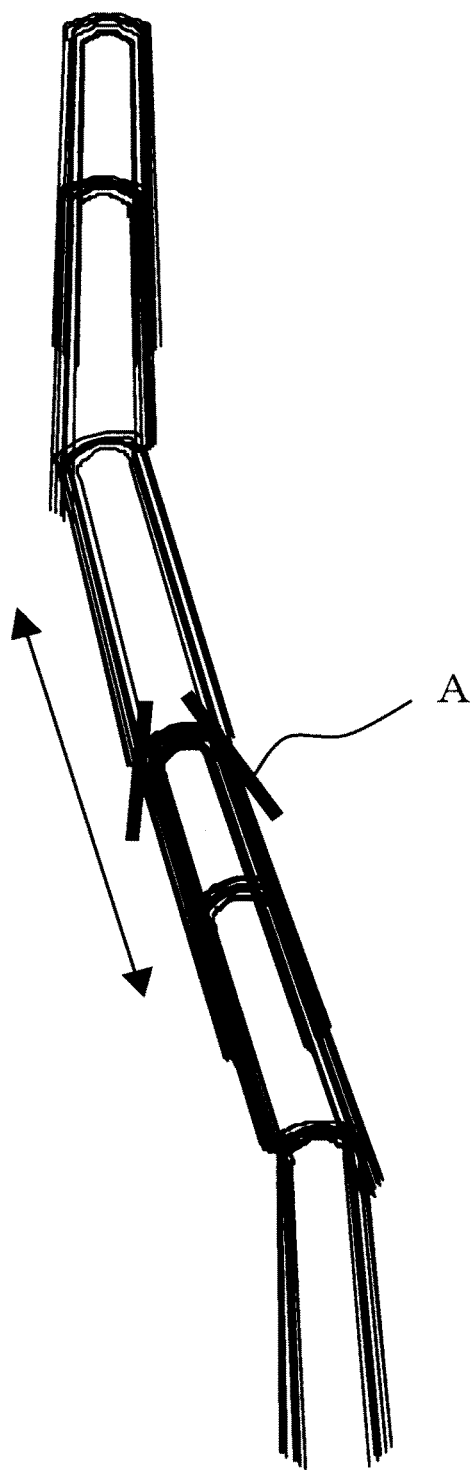
FIG. 6 is a schematic drawing showing that a fine carbon fiber is pulled out to form a fine short carbon fiber by shear stress.

FIG. 5 shows a TEM image of the fine carbon fiber prepared in Reference Example A3.

Reference Example B1

A catalyst prepared as described in Reference Example A1 was used. A quartz reaction tube (inner diameter: 75 mmϕ, height: 650 mm) was perpendicularly fixed and in its center was placed a support of silica wool on which was then dispersed 0.9 g of the catalyst. Under He atmosphere, the tube was heated to a furnace temperature of 545° C., and then a mixed gas consisting of CO and $H_2$ (volume ratio: $CO/H_2=95.5/4.5$) as a source gas was fed from the bottom of the reaction tube at a flow rate of 1.45 L/min for 7 hours, to synthesize a fine carbon fiber.

An yield was 56.7 g, and an ash content was determined as 1.4% by weight. A peak half width "W" (degree) observed in XRD analysis of the product was 3.39 and d002 was 0.3424 nm.

A fine carbon fibers thus obtained was treated by a ceramic ball mill with a diameter of 2 mm for a predetermined time to prepare a fine short carbon fiber. FIGS. 7 and 8 show TEM images of a fine short carbon fiber after 20 hours. From the TEM images in FIGS. 7 and 8, parameters related to the dimensions of temple-bell-shaped structural units constituting the fine short carbon fiber thus obtained and the aggregate of these were D=10.6 to 13.2 nm, L/D=2.0 to 5.5, θ=0.5° to 10°. Here, θ is an inclination average of the right and the left carbon layers to the center of the fiber axis in the TEM image. A stack number of the temple-bell-shaped structural units forming the aggregate was 10 to 20.

Materials

Materials used in Examples and Comparative Examples are as follows.

Ultrafine Carbon Fiber (1) Multilayer carbon nanotube (Aldrich):

Outer diameter: 5 to 25 nm, inner diameter: 3 to 10 nm, layer number: 3 to 17, length: 0.5 to 10 μm.

(2) Platelet type carbon nanofiber (CNF-P, from Jemco Co. Ltd.):
Outer diameter: 20 to 100 nm, length: 0.1 to 1 μm.
Resin
(1) low-density polyethylene (LF441H, from Japan Polychem Corporation)
(2) Polyamide 6(UBE Nylon 1010X1, from Ube Industries, Ltd.)
(3) Polyamide 6(UBE Nylon 1030B, from Ube Industries, Ltd.)
(4) Polyamide 66(UBE Nylon 2015B, from Ube Industries, Ltd.)
(5) Polyamide 6/66(UBE Nylon 5013B, from Ube Industries, Ltd.)
(6) Polyamide 6/66(UBE Nylon 5034B, from Ube Industries, Ltd.)
(7) Polyamide 6/66/12(TERPALEX6434B, from Ube Industries, Ltd.)
(8) Polyamide 12(UBESTA3012U, from Ube Industries, Ltd.)
(9) Polyamide 12(UBESTA3030XA, from Ube Industries, Ltd.)
(10) Amorphous polyamide (sealer from Du Pont-Mitsui Polychemicals Co., Ltd.)
(11) Polycarbonate resin (lupilon H-4000, S-3000, E-2000, from Mitsubishi Engineering-Plastics Corporation)
(12) Silicone rubber (from Dow Corning Toray Co., Ltd., rubber hardness: 30).
Measurement A volume resistance of carbon fiber powder was measured using a powder resistance measuring system model MCP-PD51 (Dia Instruments Co., Ltd.), and a volume resistance of a resin composition was measured using a low-resistivity meter Loresta-GP (MCP-T610) and a high-resistivity meter Hiresta-UP (MCP-HT450) (Dia Instruments Co., Ltd.). A rubber hardness was measured using ASKER rubber hardness tester model A from Kobunshi Keiki Co., Ltd.

A viscosity of a polyamide is a relative viscosity measured at a polymer concentration of 1% in 96% sulfuric acid.

Example 1

Fine carbon fibers prepared as described in Reference Example A1 and a low-density polyethylene resin were combined in appropriate amounts and melt-mixed with heating at 160° C. using a three-roll mill to disperse the fibers in the resin. The molten composition thus obtained was pelletized to provide a conductive resin composition. This pellet was melt-molded into a film with a thickness of 50 μm by a film molding machine. Table 1 shows the measurement results of a volume resistance (Ω·cm)(applied voltage: 10 V) for the film together with formulations.

Comparative Example 1

Carbon nanotube, card type (platelet) carbon fibers and a low-density polyethylene resin were combined, melt-mixed and film-molded as described in Example 1. Table 1 shows the measurement results of a volume resistance for the film obtained together with formulations.

TABLE 1

| | ultrafine carbon fiber | Content (% by weight) | | | | |
|---|---|---|---|---|---|---|
| | | 1.5% | 3% | 6% | 8% | 10% |
| Example 1 | fine carbon fiber | $7 \times 10^{10}$ | $2 \times 10^3$ | $5 \times 10^1$ | $7 \times 10^0$ | $6 \times 10^0$ |
| Comparative Example 1-1 | carbon nanotube | $10^{16}$ or more | $8 \times 10^6$ | $9 \times 10^1$ | $6 \times 10^1$ | $4 \times 10^1$ |
| Comparative Example 1-2 | Platelet | $10^{16}$ or more | $10^{16}$ or more | $8 \times 10^{10}$ | $5 \times 10^6$ | $3 \times 10^3$ |

Figures in the table are in Ω·cm.

Example 2

Fine carbon fibers and a silicone raw rubber were combined in appropriate amounts, and homogeneously mixed and dispersed using a three-roll mill to prepare a conductive silicone composition. The composition was shaped into a sheet with a thickness of 500 μm and vulcanized. Table 2 shows a volume resistance (Ω·cm) (applied voltage: 10 V) of the sheet and a rubber hardness together with formulations.

Example 3

Fine short carbon fibers prepared by 24-hour ball milling as described in Reference Example B1 and a silicone raw rubber were combined in appropriate amounts and homogeneously mixed and dispersed using a three-roll mill as described in Example 2 to prepare a conductive silicone composition. The composition was shaped into a sheet with a thickness of 500 μm and vulcanized. Table 2 shows a volume resistance (Ω·cm) (applied voltage: 10 V) of the sheet and a rubber hardness together with formulations.

Comparative Example 2

Carbon nanotube and a silicone rubber were combined, mixed, shaped into a sheet and vulcanized as described in Example 2. Table 2 shows a volume resistance of the sheet together with formulations. A formulation with a carbon nanotube content of 20% by weight could not be shaped into a sheet due to hardening of the silicone rubber.

TABLE 2

| | | Content (% by weight) | | | | | |
|---|---|---|---|---|---|---|---|
| | | 0 | 1.25 | 2.5 | 5 | 10 | 20 |
| Example 2 Fine carbon fiber | Volume resistance Ω·cm | | $4 \times 10^6$ | $8 \times 10^4$ | $2 \times 10^2$ | $3 \times 10^0$ | $9 \times 10^{-1}$ |
| | Rubber hardness ° | 35 | 40 | 45 | 52 | 57 | 60 |

TABLE 2-continued

|  |  | Content (% by weight) | | | | |
| --- | --- | --- | --- | --- | --- | --- |
|  |  | 0 | 1.25 | 2.5 | 5 | 10 | 20 |
| Example 3 Fine short carbon fiber | Volume resistance $\Omega \cdot cm$ |  | $6 \times 10^6$ | $9 \times 10^4$ | $3 \times 10^2$ | $4 \times 10^0$ | $9 \times 10^{-1}$ |
|  | Rubber hardness ° | 35 | 37 | 41 | 45 | 51 | 55 |
| Comparative Example 2 carbon nanotube | Volume resistance $\Omega \cdot cm$ |  | $10^{16}$ or more | $8 \times 10^5$ | $2 \times 10^3$ | $8 \times 10^1$ | Sheet could not be obtained |
|  | Rubber hardness ° | 35 | 46 | 55 | 72 | 90 | 100 or more |

Example 4

Fine carbon fiber and amorphous polyamide were combined in 7% by weight and 93% by weight, respectively, and the mixture was pre-mixed by a Henschel mixer, and the blend was melt-mixed by a biaxial extruder at 250° C. The molten mixture was pelletized to provide a conductive resin composition. This pellet was passed through a melt spinning machine at 270° C. (300 denier, 48 holes), to give polyamide fibers. The fibers had an outer diameter of 50 μm as observed by SEM and a resistance per a unit length (applied voltage: 10 V) was $7 \times 10^9$ $\Omega$/cm.

Comparative Example 3

Carbon nanotube in 7% by weight was melting-mixed with amorphous polyamide, pelletized and melt-spun as described in Example 3, but it was not spun due to thread breakage.

Example 5

Fine carbon fibers and Nylon 6 (1010X1, from Ube Industries, Ltd.; relative viscosity: 2.00) were combined in 7% by weight and 93% by weight, respectively, and the mixture was pre-mixed by a Henschel mixer, and the blend was melt-mixed by a biaxial extruder at 250° C. and pelletized to provide a conductive resin composition. This pellet was injection-molded at 250° C. and its resin properties were determined in accordance with the ASTM specifications. Furthermore, this pellet was melt-pressed at 250° C. and a volume resistance was measured. The results are shown in Table 3.

Example 6

A sample was prepared and evaluated as described in Example 5, except that Nylon 6 (1030B, from Ube Industries, Ltd.; relative viscosity: 4.07) was used. The results are shown in Table 3.

Comparative Example 4

Resin properties were determined as described in Example 5, except that Nylon 6 used in Example 5 was used and a fine carbon fiber was not used. The results are shown in Table 3.

TABLE 3

|  |  | Example 5 | Example 6 | Comparative Example 4 |
| --- | --- | --- | --- | --- |
| Volume resistivity | $\Omega \cdot cm$ | $7.5 \times 10^2$ | $2.3 \times 10^3$ | $10^{16}$ or more |

TABLE 3-continued

|  |  |  | Example 5 | Example 6 | Comparative Example 4 |
| --- | --- | --- | --- | --- | --- |
| Tensile strength | Yield point strength | MPa | 84.8 | 82.1 | 80.0 |
|  | Elongation at break | % | 14.6 | 47.2 | 40.0 |
| Bending | Strength | MPa | 121 | 119 | 110 |
|  | Elastic modulus | GPa | 3.26 | 3.28 | 2.70 |
| Izod impact strength (with notch) |  | J/m | 37.2 | 48.5 | 42.1 |

Example 7

A sample was prepared and evaluated as described in Example 5, except that Nylon 66 (2015B, from Ube Industries, Ltd.; relative viscosity: 2.45) was used, pelletization was conducted using a biaxial extruder at a temperature of 280° C., the pellet was injection-molded at a temperature of 280° C., and the pellet was melt-pressed at a temperature of 275° C. The results are shown in Table. 4.

Comparative Example 5

A sample was prepared and evaluated as described in Example 5, except that Nylon 66 used in Example 7 was used and a fine carbon fiber was not used. The results are shown in Table 4.

TABLE 4

|  |  |  | Example 7 | Comparative Example 5 |
| --- | --- | --- | --- | --- |
| Volume resistivity |  | $\Omega \cdot cm$ | $4.5 \times 10^3$ | $10^{16}$ or more |
| Tensile strength | Yield point strength | MPa | 88.9 | 85.1 |
|  | Elongation at break | % | 10.1 | 30.0 |
| Bending | Strength | MPa | 127 | 115 |
|  | Elastic modulus | GPa | 3.95 | 3.10 |
| Izod impact strength (with notch) |  | J/m | 33.3 | 39.8 |

Example 8

A sample was prepared and evaluated as described in Example 5, except that Nylon 6/66 copolymer (5013B, from Ube Industries, Ltd.; relative viscosity: 2.45; a component ratio of Nylon 6 to Nylon 66: 85/15). The results are shown in Table 5.

Example 9

A sample was prepared and evaluated as described in Example 5, except that Nylon 6/66 copolymer (5034B, from Ube Industries, Ltd.; relative viscosity: 4.05; a component ratio of Nylon 6 to Nylon 66: 80/20). The results are shown in Table 5.

Comparative Example 6

A sample was prepared and evaluated as described in Example 5, except that Nylon 6/66 copolymer used in Example 8 was used and a fine carbon fibers was not used. The results are shown in Table 5.

TABLE 5

|  |  |  | Example 8 | Example 9 | Comparative Example 6 |
|---|---|---|---|---|---|
| Volume resistivity |  | Ω·cm | $1.5 \times 10^2$ | $2.3 \times 10^2$ | $10^{16}$ or more |
| Tensile strength | Yield point strength | MPa | 70.8 | 69.4 | 65.0 |
|  | Elongation at break | % | 106.2 | 119.3 | 200.0 |
| Bending | Strength | MPa | 113 | 101 | 97 |
|  | Elastic modulus | GPa | 2.76 | 2.48 | 2.30 |
| Izod impact strength (with notch) |  | J/m | 57.4 | 62.0 | 67.0 |

Example 10

A sample was prepared and evaluated as described in Example 5, except that Nylon 6/66/12 copolymer (6434B, from Ube Industries, Ltd.; relative viscosity: 4.05; a component ratio of Nylon 6/Nylon 66/Nylon 12: 80/10/10) was used, pelletization was conducted using a biaxial extruder at a temperature of 230° C., the pellet was injection-molded at a temperature of 230° C., and the pellet was melt-pressed at a temperature of 235° C. The results are shown in Table 6.

Comparative Example 7

A sample was prepared and evaluated as described in Example 5, except that Nylon 6/66/12 copolymer used in Example 10 was used and a fine carbon fiber was not used. The results are shown in Table 6.

TABLE 6

|  |  |  | Example 10 | Comparative Example 7 |
|---|---|---|---|---|
| Volume resistivity |  | Ω·cm | $7.5 \times 10^1$ | $10^{16}$ or more |
| Tensile strength | Yield point strength | MPa | 40.0 | 37.0 |
|  | Elongation at break | % | 142 | >200 |
| Bending | Strength | MPa | 55.3 | 52.0 |
|  | Elastic modulus | GPa | 1.45 | 1.30 |
| Izod impact strength (with notch) |  | J/m | 72.8 | 85.0 |

Example 11

A sample was prepared and evaluated as described in Example 5, except that Nylon 12(3012U, from Ube Industries, Ltd.; relative viscosity: 1.60) was used, pelletization was conducted using a biaxial extruder at a temperature of 230° C., the pellet was injection-molded at a temperature of 230° C., and the pellet was melt-pressed at a temperature of 235° C. The results are shown in Table. 7.

Example 12

A sample was prepared and evaluated as described in Example 5, except that Nylon 12(3030×A, from Ube Industries, Ltd.; relative viscosity: 2.25) was used, pelletization was conducted using a biaxial extruder at a temperature of 230° C., the pellet was injection-molded at a temperature of 230° C., and the pellet was melt-pressed at a temperature of 235° C. The results are shown in Table. 7.

Comparative Example 8

A sample was prepared and evaluated as described in Example 5, except that Nylon 12 used in Example 12 was used and a fine carbon fiber was not used. The results are shown in Table 7.

TABLE 7

|  |  |  | Example 11 | Example 12 | Comparative Example 8 |
|---|---|---|---|---|---|
| Volume resistivity |  | Ω·cm | $2.3 \times 10^1$ | $4.4 \times 10^2$ | $10^{16}$ or more |
| Tensile strength | Yield point strength | MPa | 51.0 | 50.4 | 47.1 |
|  | Elongation at break | % | 73.1 | 85.8 | >200 |
| Bending | Strength | MPa | 75.3 | 80.1 | 62.0 |
|  | Elastic modulus | GPa | 1.85 | 1.78 | 1.50 |
| Izod impact strength (with notch) |  | J/m | 57.4 | 60.4 | 67.0 |

Example 13

Fine carbon fibers and a polycarbonate resin were combined in 3% by weight and 97% by weight, respectively, the mixture was pre-mixed by a Henschel mixer, and the blend was melt-mixed by a biaxial extruder at 250° C. and the molten mixture was pelletized to provide a conductive resin composition. This pellet was melted at 290° C. and molded by an extruder to form films having a thickness of 100 μm and 30 μm (width: 30 cm). A surface resistance (applied voltage: 10 V) of the films obtained was measured. The results are shown in Table 8.

Comparative Example 9

As described in Example 13, 3% by weight of carbon nanotube was melt-mixed in a polycarbonate resin, and the mixture was pelletized and molded by an extruder to give films. Although a film having a thickness of 100 μm was formed, a film having a thickness of 30 μM could not be formed due to surging giving broken films. A surface resistance (applied voltage: 10 V) of the film obtained was measured. The results are shown in Table 8.

TABLE 8

|  | Film thickness | |
| --- | --- | --- |
|  | 100 μm | 30 μm |
| Example 13 Fine carbon fiber | $2.6 \times 10^4$ Ω/□ | $6.3 \times 10^7$ Ω/□ |
| Comparative Example 9 Carbon nanotube | $4.8 \times 10^6$ Ω/□ | Cannot be molded |

Example 14

Preparation of a Conductive Binder

To 300 g of an aqueous solution containing 50 g of a 10% by weight aqueous dispersion of PTFE (tetrafluoroethylene resin), added was 40 g of an aqueous solution in which fine carbon fibers were dispersed in 5% by weight. While stirring the solution by a homogenizer, 5 g of acetylene black was gradually added. Thirty minutes after the addition, methanol was added to the solution to precipitate a complex compound. If precipitation is not initiated by methanol addition, the aqueous solution is acidic, and therefore, 1 to 3 N aqueous ammonia may be added until ammonia odor is detected to make the solution alkaline and then 100 mL of methanol is added to the solution to precipitate a complex compound. The complex compound was filtered, washed and then dried at 80° C., to give about 10 g of a conductive binder. Here, with respect to the composition of the conductive binder, a weight ratio of the total conductive materials (fine carbon fibers+acetylene black) to PTFE was 2:1, and a weight ratio of acetylene black to fine carbon fibers was 2:1.

Example 15

Production of an $LiCoO_2$ Electrode Containing a Conductive Binder

To 8.77 g of a 1.9% CMC solution, 0.5 g of the conductive binder in Example 14 was added, and the mixture was stirred for 15 min using a juicing blender. Then, to the mixture was added 6.0 g of an electrode active material $LiCoO_2$, and the mixture was stirred for additional 15 min, to prepare a slurry for an electrode. The slurry thus obtained was applied on an aluminum foil and dried to provide an electrode. With respect to a composition of the electrode, the contents of the active material $LiCoO_2$, the total binders (PTFE+CMC) and the total conductive materials (acetylene black+fine carbon fibers) were 90%, 5% and 5%, respectively.

Example 16

Properties of a Battery Using an $LiCoO_2$ Electrode Containing a Conductive Binder A coin battery was produced using the electrode in Example 15 as a positive electrode, Li metal as a negative electrode, an 1M solution of $LiPF_6$ in ethylene carbonate (EC) and methyl ethyl carbonate (MEC) (volume ratio: EC:MEC=3:7) as an electrolytic solution, and its charge/discharge capacity was measured. For measuring a charge/discharge capacity, the battery was charged at a constant current of 1C rate, and then, after a voltage reached 4.2 V, discharge was conducted at a constant current of 1C rate and a capacity until a voltage reached 3.0 V was determined as a discharge capacity. The results are shown in Table 9.

Comparative Example 10

To 11.68 g of a 1.9% CMC solution, added were 2.22 g of an aqueous 10% by weight PTFE dispersion, 1.48 g of an aqueous solution in which fine carbon fibers were dispersed in 15% by weight and 0.296 g of acetylene black, and the mixture was stirred for 15 min using a juicing blender. Then, to the mixture, 8.0 g of an electrode active material $LiCoO_2$ was added, and the mixture was stirred for additional 15 min, to prepare a slurry for an electrode. The slurry thus obtained was applied on an aluminum foil and dried to provide an electrode.

A coin battery was produced as described in Example 16, using the electrode obtained as a positive electrode, and its charge/discharge capacity was measured. The results are shown in Table 9.

TABLE 9

|  | First cycle Discharge capacity (mAh/g) | First cycle Efficiency | Fifth cycle Discharge capacity holding ratio |
| --- | --- | --- | --- |
| Example 16 | 128.3 | 88.7% | 100% |
| Comparative Example 10 | 116.3 | 81.5% | 95% |

Efficiency (%) = Discharge capacity/charge capacity × 100
Discharge capacity holding ratio (%) = $n^{th}$ cycle discharge capacity/first cycle discharge capacity In Example 16 using a conductive binder, a discharge capacity in the first cycle, an efficiency in the first cycle and a discharge capacity holding ratio in the fifth cycle are higher than Comparative Example 10, indicating that binding between electrode active materials is achieved without deterioration in conductivity.

Example 17

Production of an $LiFePO_4$ Electrode Containing an Electrode Conductive Binder

To 10.0 g of a 2.0% CMC solution, 0.54 g of the conductive binder in Example 14 was added, and the mixture was stirred for 15 min using a juicing blender. Then, 4.27 g of an electrode active material $LiFePO_4$ is added and the mixture was stirred for 15 min. Furthermore, for homogeneous distribution of the conductive material and others in the electrode, the mixture was treated by a planetary slurry maker, to prepare a slurry for an electrode. The slurry thus obtained was applied on an aluminum foil, dried and pressed to provide an electrode. For a composition of the electrode, the contents of the active material $LiFePO_4$, the total binders (PTFE+CMC) and the total conductive materials (acetylene black+fine carbon fibers) were 85.4%, 7.6% and 7.2%, respectively.

Example 18

Properties of a Battery Using an $LiFePO_4$ Electrode Containing a Conductive Binder A coin battery was produced using the electrode in Example 17 as a positive electrode, Li metal as a negative electrode, an 1M solution of $LiPF_6$ in ethylene carbonate (EC) and methyl ethyl carbonate (MEC) (volume ratio: EC:MEC=3:7) as an electrolytic solution, and its charge/discharge capacity was measured. For measuring a charge/discharge capacity, the battery was charged at a constant current of 2C rate, and then, after a voltage reached 4.2 V, discharge was conducted at a constant current of 2C rate and a capacity until a voltage reached 2.8 V was determined as a discharge capacity. The results are shown in Table 10 and FIG. 9.

Comparative Example 11

To 10.0 g of a 2.0% CMC solution, 0.18 g of PTFE, 0.18 g of fine carbon fibers and 0.18 g of acetylene black were added, and the mixture was stirred for 15 min using a juicing blender. Then, 4.27 g of an electrode active material $LiFePO_4$ was added and the mixture was stirred for 15 min. Furthermore, for homogeneous distribution of the conductive material and others in the electrode, the mixture was treated by a planetary slurry maker, to prepare a slurry for an electrode. The slurry thus obtained was applied on an aluminum foil, dried and pressed to provide an electrode.

A coin battery was produced as described in Example 18, using the electrode obtained as a positive electrode, and its charge/discharge capacity was measured. The results are shown in Table 10.

TABLE 10

|  | Discharge capacity (mAh/g) | | |
| --- | --- | --- | --- |
|  | 1 cycle | 50 cycles | 100 cycles |
| Example 18 | 107.2 | 119.9 | 119.0 |
| Comparative Example 11 | 55.4 | 88.8 | 91.4 |

In Example 18 using a conductive binder, a discharge capacity is higher than Comparative Example 11, indicating that binding between electrode active material is achieved without deterioration in conductivity.

Industrial Usability

A conductive resin composition of the present invention exhibits high conductivity while maintaining the original physical properties of the resin. It is useful as an electromagnetic-wave shielding member, an antistatic component and a member for electrostatic coating in the electric/electronic field and the automotive field, and further in applications such as a tray, a packing material, a building material for a clean room, a dust-free garment used in a manufacturing or transporting process of a semiconductor device, and a conductive member for an electronic device (for example, a belt, a sheath, a roll, a connector, a gear and a tube).

DESCRIPTION OF SYMBOLS

11: structural unit
12: head-top part
13: body-part
21, 21a, 21b, 21c: aggregate

The invention claimed is:

1. A conductive resin composition, comprising:
   (a) a resin component, and
   (b) a fine carbon fiber dispersed in the resin component, wherein a graphite-net plane consisting solely of carbon atoms forms a temple-bell-shaped structural unit comprising closed head-top part and body-part with open lower-end where an angle θ formed by a generatrix of the body-part and a fiber axis is less than 15°, 2 to 30 of the temple-bell-shaped structural units are stacked sharing a common central axis to form an aggregate having an aspect ratio (L/D) of 2 to 150 wherein an end of the body-part of the aggregate has an outer diameter D of 5 to 40 nm and an inner diameter d of 3 to 30 nm and wherein L is a length of the aggregate, and the aggregates are connected in head-to-tail style with a distance by van der Waals force to form the fine carbon fiber;
   wherein an amount of the fine carbon fibers is 0.1% by weight or more and less than 40% by weight, based on the total weight of the composition, and the resin component comprises a resin selected from the group consisting of thermoplastic resins, elastomers, thermosetting resins, photo- and electron-beam curable resins and reactive resins.

2. The composition according to claim 1, wherein the fine carbon fiber is produced by vapor phase growth using a catalyst containing an element selected from the group consisting of Fe, Co, Ni, Al, Mg and Si, and an ash content in the fine carbon fiber is 4% by weight or less.

3. The composition according to claim 1, wherein the fine carbon fiber is a fine short carbon fiber in which 100 or less of the aggregates are connected.

4. The composition according to claim 3, wherein the fine short carbon fibers are produced by fiber shortening by applying shear stress.

5. The composition according to claim 1, wherein the resin component is selected from thermoplastic resins.

6. The composition according to claim 5, wherein the resin component is a polyamide.

7. A conductive binder comprising the composition according to claim 1 and a carbon material having a structure configuration, whereby forming a composite material.

8. An electrode for an electrical charge storage device comprising the conductive binder according to claim 7.

9. An electrical charge storage device comprising the electrode for an electrical charge storage device according to claim 8.

10. The composition according to claim 1, wherein the resin component comprises
   (i) a thermoplastic resin selected from the group consisting of polyolefin resins, polyamide resins, polyvinyl resins, polyester resins, polyether resins, fluororesins, and mixture of two or more of these,
   (ii) a thermoplastic elastomer selected from the group consisting of olefin-, styrene-, ester-, amide-, urethane- and polybutadiene-based elastomers,
   (iii) a biodegradable resin, or
   (iv) a thermosetting resin selected from the group consisting of phenol resins, amino resins, unsaturated polyester resins, polyimide resins, polyurethane resins, epoxy resins and silicone resins.

* * * * *